(12) United States Patent
Boissonneault et al.

(10) Patent No.: US 11,481,103 B2
(45) Date of Patent: Oct. 25, 2022

(54) METHODS AND SYSTEMS FOR DESIGN AND PRODUCTION OF CUSTOMIZED WEARABLE EQUIPMENT

(71) Applicant: BAUER HOCKEY LTD., Blainville (CA)

(72) Inventors: Raymond Boissonneault, Saint-Hippolyte (CA); Jean-Francois Laperriere, Prevost (CA); Jacques Durocher, Saint-Jerome (CA); Mathieu Poitras, Saint-Jerome (CA); Thierry Krick, Coteau-du-Lac (CA); Thomas Lemelin, Mirabel (CA)

(73) Assignee: BAUER HOCKEY LLC, Exeter, NH (US)

( * ) Notice: Subject to any disclaimer, the term of this patent is extended or adjusted under 35 U.S.C. 154(b) by 421 days.

(21) Appl. No.: 16/448,622

(22) Filed: Jun. 21, 2019

(65) Prior Publication Data

US 2020/0034016 A1 Jan. 30, 2020

Related U.S. Application Data

(60) Provisional application No. 62/692,057, filed on Jun. 29, 2018.

(51) Int. Cl.
*G06F 3/0487* (2013.01)
*G06Q 30/06* (2012.01)
(Continued)

(52) U.S. Cl.
CPC .............. *G06F 3/0487* (2013.01); *A42B 3/20* (2013.01); *G06F 3/04847* (2013.01);
(Continued)

(58) Field of Classification Search
CPC ..... G06Q 30/0621; G06T 19/20; G06T 17/10; G06T 2219/2004; G06T 2219/2021; A42B 3/20; G06F 3/0487; G06F 3/04847
See application file for complete search history.

(56) References Cited

U.S. PATENT DOCUMENTS

| 4,466,138 A | * | 8/1984 | Gessalin | B29C 45/14 2/410 |
| 9,545,127 B1 | * | 1/2017 | Sandifer | A42C 2/007 |

(Continued)

FOREIGN PATENT DOCUMENTS

| JP | 2007-532344 A | * | 4/2005 | ............. B29C 51/10 |
| KR | 10-0842444 B1 | * | 3/2007 | ............. B29C 45/26 |

OTHER PUBLICATIONS

Computer Aided Design and Development of Customized Shoe Last, Sambhav et al, 2011.

*Primary Examiner* — Charles E Anya

(57) ABSTRACT

Methods and systems for customizing wearable equipment such as athletic equipment, including ice skates and protective equipment such as masks. For example, a hockey goaltender mask may comprise a shell a liner attached to the shell, the liner being customized for a face of a user. The liner may be produced using a customized mold. Such customized mold may include a base mold and at least one attachment attached to the base mold; wherein each of the at least one attachment is characterized by at least one feature determined based on computer processing of data representative of the face of the user.

16 Claims, 40 Drawing Sheets

(51) Int. Cl.
  *G06F 3/04847* (2022.01)
  *A42B 3/20* (2006.01)
  *G06T 19/20* (2011.01)
  *G06T 17/10* (2006.01)

(52) U.S. Cl.
  CPC ......... *G06Q 30/0621* (2013.01); *G06T 17/10* (2013.01); *G06T 19/20* (2013.01); *G06T 2219/2004* (2013.01); *G06T 2219/2021* (2013.01)

(56) References Cited

U.S. PATENT DOCUMENTS

| | | | |
|---|---|---|---|
| 2005/0119777 A1* | 6/2005 | Arbogast | A61F 2/7812 700/117 |
| 2006/0101559 A1* | 5/2006 | Moore, III | B29C 44/60 2/410 |
| 2014/0081601 A1* | 3/2014 | Zhang | G06T 17/20 703/1 |
| 2014/0201889 A1* | 7/2014 | Pietrzak | B33Y 10/00 2/410 |
| 2015/0173446 A1* | 6/2015 | DeBoer | A63B 71/10 2/424 |
| 2016/0180587 A1* | 6/2016 | Bai | A62B 7/04 345/419 |
| 2016/0207112 A1* | 7/2016 | Pallari | B33Y 10/00 |
| 2018/0092428 A1* | 4/2018 | Knight | A42C 2/007 |
| 2018/0153244 A1* | 6/2018 | Kirshon | B29C 39/026 |
| 2018/0317610 A1 | 11/2018 | Golub | |

* cited by examiner

Attach one or more attachments to a base mold in order to produce a customized mold, the attachment(s) being characterized by at least one feature determined based on computer processing of data representative of the body part

1510

Produce at least part of the customized item of wearable equipment from production material shaped using the customized mold

METHODS AND SYSTEMS FOR DESIGN AND PRODUCTION OF CUSTOMIZED WEARABLE EQUIPMENT

CROSS-REFERENCE TO RELATED APPLICATION

The present application claims the benefit under 35 U.S.C. 119(e) of U.S. Provisional Application Ser. No. 62/692,057, filed on Jun. 29, 2018, naming Boissonneault et al. as inventors, and hereby incorporated by reference herein.

FIELD

The present disclosure relates to methods and systems for customizing wearable equipment such as athletic equipment, including ice skates and protective equipment such as masks.

BACKGROUND

Wearable equipment such as athletic equipment, including ice skates and protective equipment (e.g., masks), is often available in a variety of models and sizes. The number of available models and sizes allows a majority of retail customers to find a suitably fitting piece of wearable equipment. However, some customers may have a morphology that is not compatible with the available models and sizes. Such customers might prefer that the wearable equipment be customized to their unique morphology. Unfortunately, typical methods of manufacturing customized wearable equipment tend to be too costly and/or time consuming to make the customization of wearable equipment a viable option for retail customers. New methods and systems for customizing wearable equipment would therefore be welcomed by the industry.

SUMMARY

According to an aspect of this disclosure, there is provided a wearable mask, comprising a shell and a liner attached to the shell. The liner is customized for a face of a user.

According to another aspect of this disclosure, there is provided a customized mold for producing a customized item of wearable equipment for a body part. The customized mold comprises a base mold and at least one attachment attached to the base mold wherein each of the at least one attachment is characterized by at least one feature determined based on computer processing of data representative of the body part.

According to another aspect of this disclosure, there is provided a method for producing a customized mold for manufacturing a customized item of wearable equipment for a body part. The method comprises providing a base mold, obtaining at least one attachment, each attachment characterized by at least one feature determined based on computer processing of the data representative of the body part, and attaching the at least one attachment to the base mold in order to produce a customized mold for use in manufacturing of the customized item of wearable equipment.

According to another aspect of this disclosure, there is provided a method for producing a customized item of wearable equipment for a body part. The method comprises attaching one or more attachments to a base mold in order to produce a customized mold, the one or more attachments characterized by at least one feature determined based on computer processing of data representative of the body part, and producing at least part of a customized item of wearable equipment from production material shaped using the customized mold.

According to another aspect of this disclosure, there is provided a method of manufacturing a liner for a hockey goaltender mask. The method comprises providing a base liner mold, providing an attachment configured to attach to the base liner mold, attaching the attachment to the base liner mold, thereby to create a customized liner mold, and using the customized liner mold to form the goalie mask liner.

According to another aspect of this disclosure, there is provided a method of manufacturing a customized hockey goaltender mask. The method comprises providing a shell, providing a base liner, providing at least one attachment customized for a face of a user, and attaching the at least one attachment, the base liner and the mask shell together to create the customized hockey goaltender mask.

According to another aspect of this disclosure, there is provided a method of creating a goalie mask liner customized for a user. The method comprises obtaining a model of a shell, obtaining a model of a face of the user, positioning the model of the face relative to the model of the shell, creating a model of a liner that at least partly fills a space between the model of the shell and the model of the face of the user, and producing the goalie mask liner from the model of the liner using production material.

According to another aspect of this disclosure, there is provided a computer-readable storage medium storing instructions which, when read by a processor of a computing device cause the computing device to carry out a method. The method comprises obtaining a model of a shell, obtaining a model of a face of the user, positioning the model of the face relative to the model of the shell, and creating a model of a liner that at least partly fills a space between the model of the shell and the model of the face of the user.

These and other aspects of this disclosure will now become apparent upon review of a description of embodiments that follows in conjunction with accompanying drawings.

BRIEF DESCRIPTION OF THE DRAWINGS

A detailed description of embodiments is provided below, by way of example only, with reference to accompanying drawings, in which;

FIG. 15 shows a variant of the process of FIG. 14, according to an example non-limiting embodiment;

It is to be expressly understood that the description and drawings are only for purposes of illustrating certain embodiments and are an aid for understanding. They are not intended to be limitative.

DETAILED DESCRIPTION

Described herein are systems and methods for designing and producing customized wearable equipment, e.g., for athletes. Examples of wearable athletic equipment could include, in the case of an ice hockey player, ice skates, masks (e.g., goaltender masks), helmets, gloves, shoulder pads or shin pads, to name a few non-limiting possibilities. Other examples of equipment that may similarly be customized could include other types of skates (for speed skating, figure skating or roller hockey), helmets (for cycling or football) and protectors or pads used in a variety of sports to protect various body parts. Customization may result in wearable equipment that is better fitting for the athlete. Of course, applications of the present methods and systems may exist in other professional areas of activity where the fit of wearable equipment is important.

An example non-limiting process for producing customized wearable equipment for a given body part (e.g., foot, face, skull, etc.) involves the creation of a customized form using a base form and at least one attachment, and then production material is shaped using the customized form to ultimately produce a customized piece of wearable equipment.

Two non-limiting variants of the example non-limiting process for producing customized wearable equipment are now described, one involving a base last that is customized using at least one "last attachment" and one involving a base mold that is customized using at least one "mold attachment". Each such attachment, be it a last attachment or a mold attachment, is characterized by at least one feature determined based on computer processing of 3D model data representative of a wearer's body part.

Variant 1: Customization Using A Last

Figure 1A:
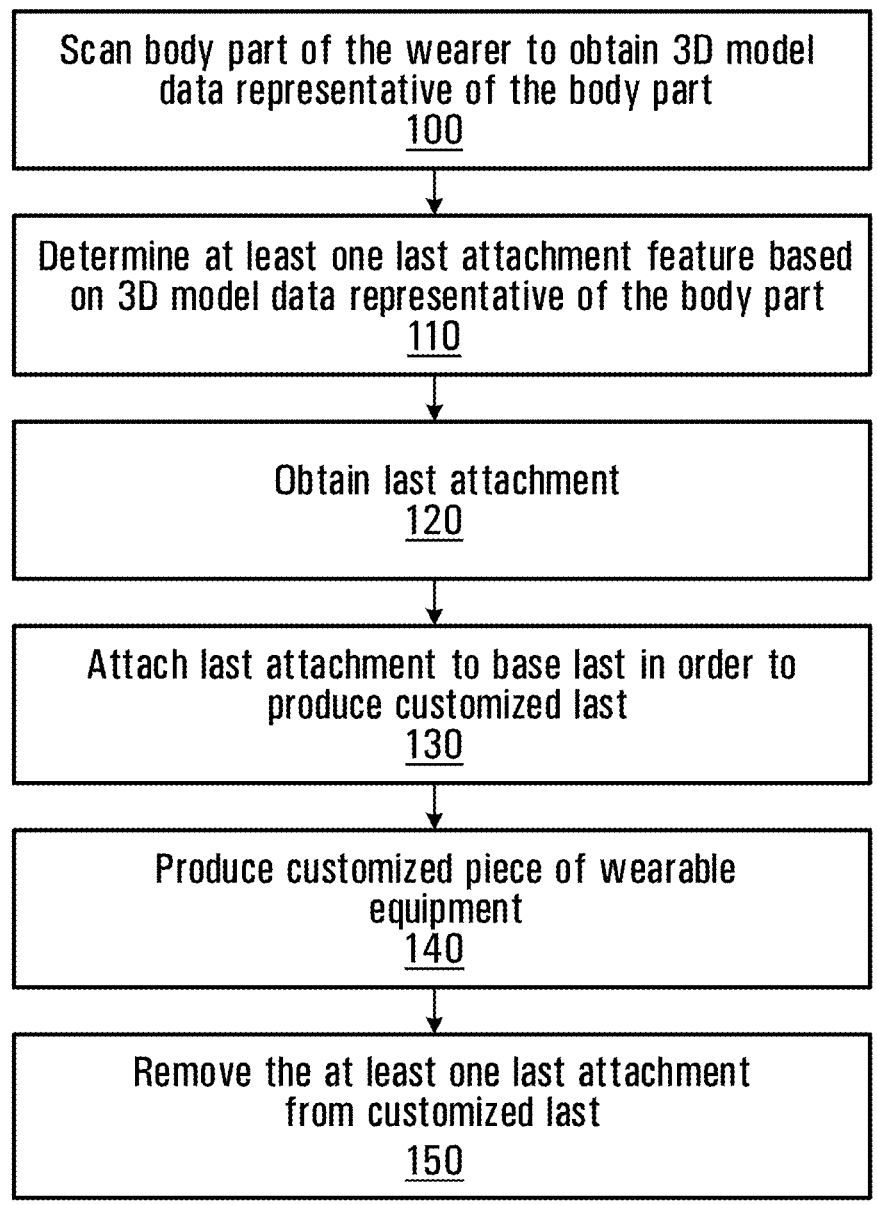
FIG. 1A is a flowchart showing steps in a process according to an example non-limiting embodiment.

With reference to FIG. 1A, a first variant of the example non-limiting process for producing customized wearable equipment may involve a subset or all of the following steps:

Step 100: Perform a 3D scan of the body part of the wearer (e.g., foot, face, skull, etc.), thereby to obtain 3D model data representative of the wearer's body part.

Step 110: Determine at least one "last attachment feature" based on the 3D model data representative of the wearer's body part.

Step 120: Obtain at least one last attachment (also referred to as a "shim" or "insert") having the one or more last attachment features determined at step 110. This could mean that the at least one last attachment is manufactured on site or remotely. This could also mean that the at least one last attachment is retrieved from inventory.

Step 130: Attach the at least one last attachment to a base last in order to produce a customized last.

Step 140: Produce a customized piece of wearable equipment from production material shaped using the customized last. The customized piece of wearable equipment is now ready to be delivered to/worn by the wearer.

Step 150: Optionally, remove the at least one last attachment from the customized last, thus leaving behind the base last.

The use of a base last and at least one attachment as described above may render the mass customization of wearable equipment more rapid and/or economically feasible for the manufacturer, while the wearer may benefit from the use of equipment customized to their body's individual morphology.

Figure 1B:
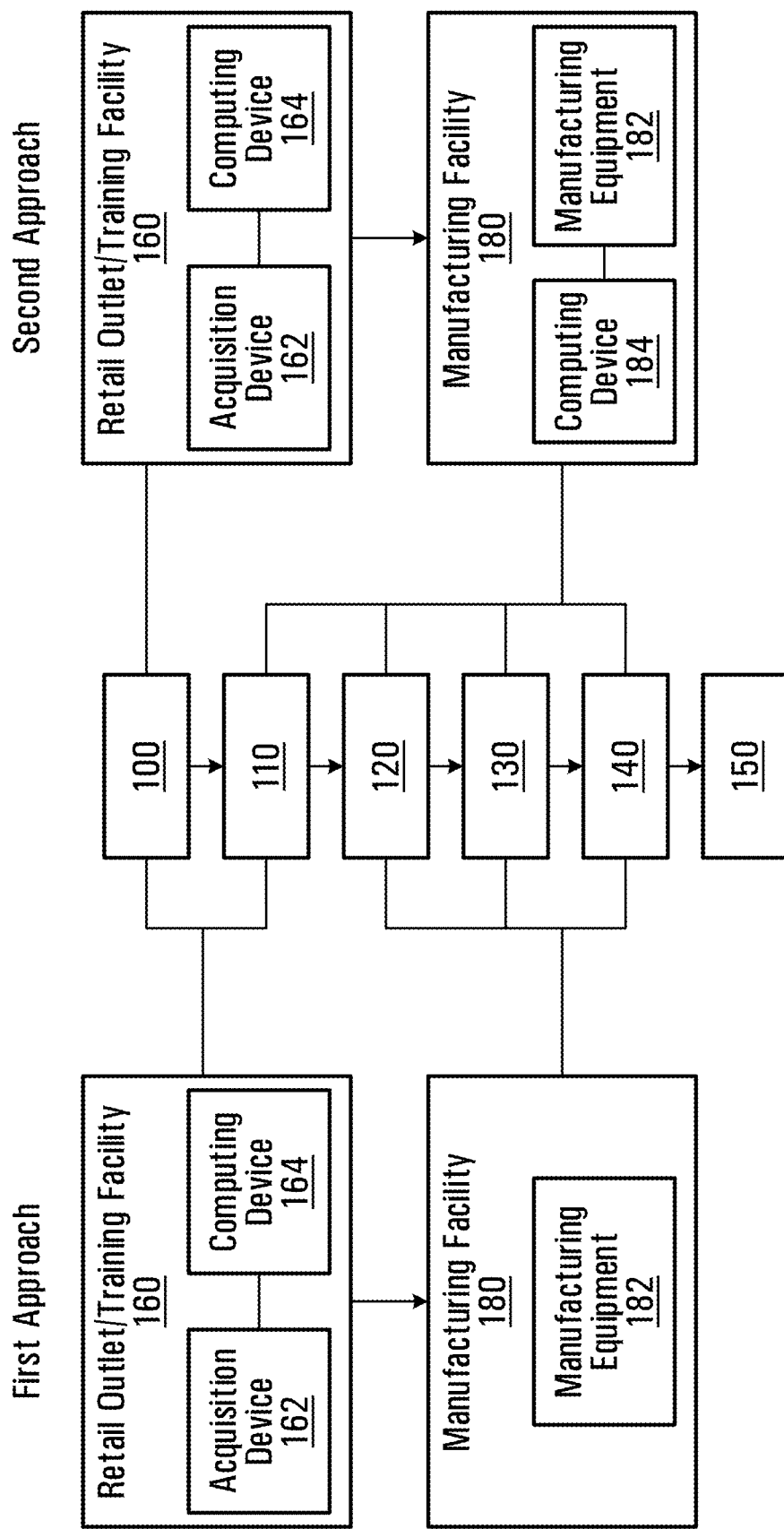
FIGS. 1B and 1C are block diagrams showing various possibilities for execution of the process FIG. 1A using a computing device.

Those skilled in the art will appreciate that the various steps in the example process may be carried out by different entities and in different locations. For example, and with reference to FIG. 1B, according to a first approach, steps 100 and 110 may be carried out at a retail outlet or training facility 160 using an image acquisition device 162 and a computing device 164, and steps 120, 130 and 140 may be carried out at a manufacturing facility 180 using manufacturing equipment 182. Alternatively, according to a second approach, step 100 may still be carried out at the retail outlet or training facility 160 using the image acquisition device 162 and the computing device 164, but step 110 is carried out at the manufacturing facility 180 using a second computing device 184, and steps 120, 130 and 140 are also carried out at the manufacturing facility as before, using the manufacturing equipment 182.

Figure 1C:

In another embodiment, shown in FIG. 1C, the image acquisition device 162 and the computing device 164 are not located at the same facility. Rather, these entities are remote from one another and communicate over a data network 163 such as the internet or a private LAN. This may involve the transmission of data packets over physical media such as coax cable, Cat5 cable, twisted pair, optical fiber, microwave and the like. As such, there may be simply a camera present at the retail outlet or training facility 160, leaving all or the majority of the data processing to occur in the cloud.

In order to provide a concrete yet non-limiting example of applicability of the process generally described above, the following portion of this part of the disclosure will focus on various steps in the production of a lasted skate using a "base last" and at least one customized "last attachment". The at least one customized last attachment is characterized by at least one last attachment feature determined based on computer processing of 3D model data representative of a wearer's foot.

However, it should be understood that various elements of the process to be described below in the context of lasted skate production may be applicable to the production of other types of wearable equipment using customized lasts.

Figure 1D:
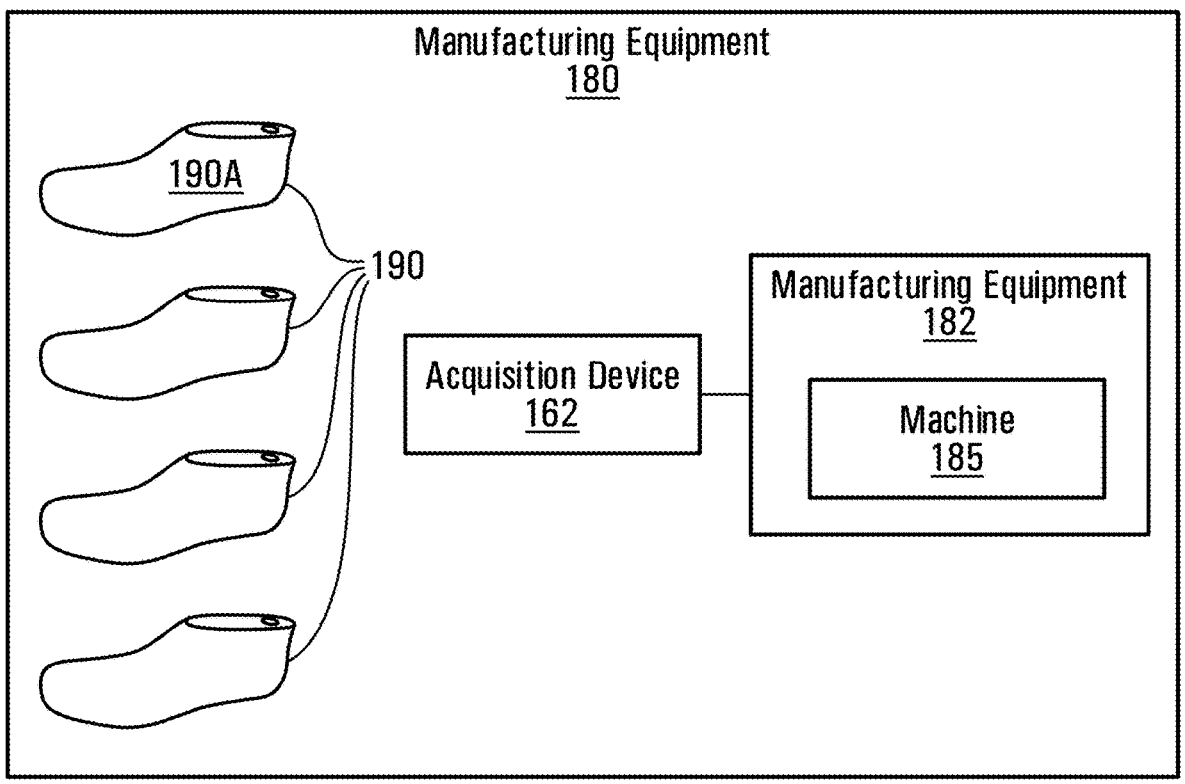
FIGS. 1D and 1E are block diagrams illustrating manufacturing equipment for producing a customized last, in accordance with the process of FIG. 1A.
Figure 1E:
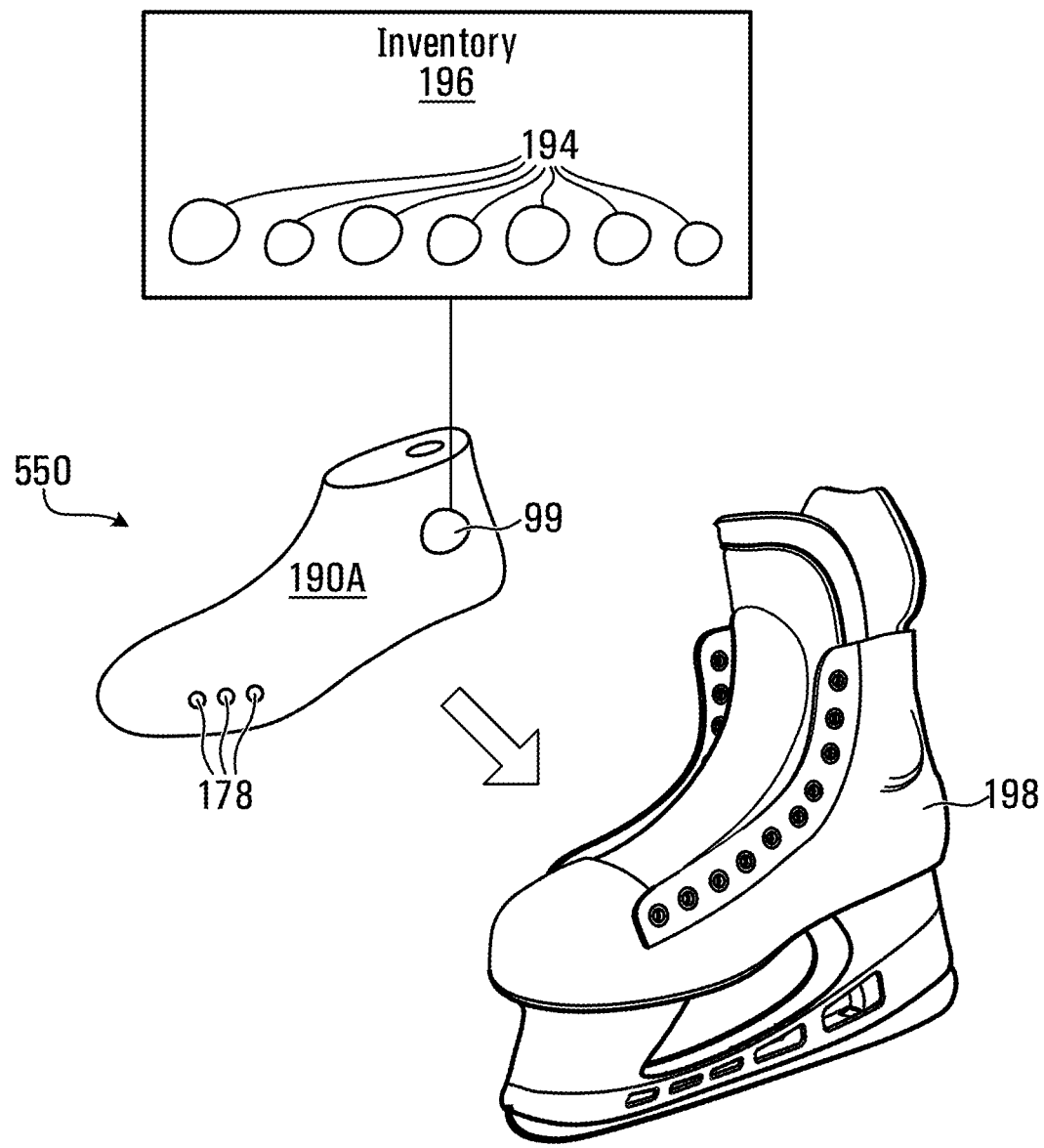

Accordingly, FIGS. 1D and 1E show the manufacturing facility 180 that includes a set of "base lasts" 190, each of which can be made out of wood or high density plastic with hinge and steel plates, for example. A particular base last 190A from the set of base lasts 190 can be used multiple times to manufacture multiple customized skates with skate boots of different interior dimensions. This variability is made possible through the use of various "last attachments", a specific combination of which is attached to the particular base last 190A before production of a skate boot. For example, and as will be described later on, at least one last attachment 99 used with the particular base last 190A to produce a skate boot 198 can be created on site by a milling or 3D printing machine 185 under control of the computing device 184 which executes a milling or printing control application so as to control the milling or printing machine 185. Alternatively, the at least one last attachment 99 may be selected from a pre-determined inventory 196 of last attachments 194.

Turning now to the steps in the process for the production of a lasted skate using a base last and customized last attachments, the following versions of steps 100 through 150 may be carried out.

Step 100: Scan Wearer's Foot to Obtain 3D Model Data Representative Thereof

This step may be carried out at a retail outlet such as a store or at the wearer's home or training facility.

Figure 2:
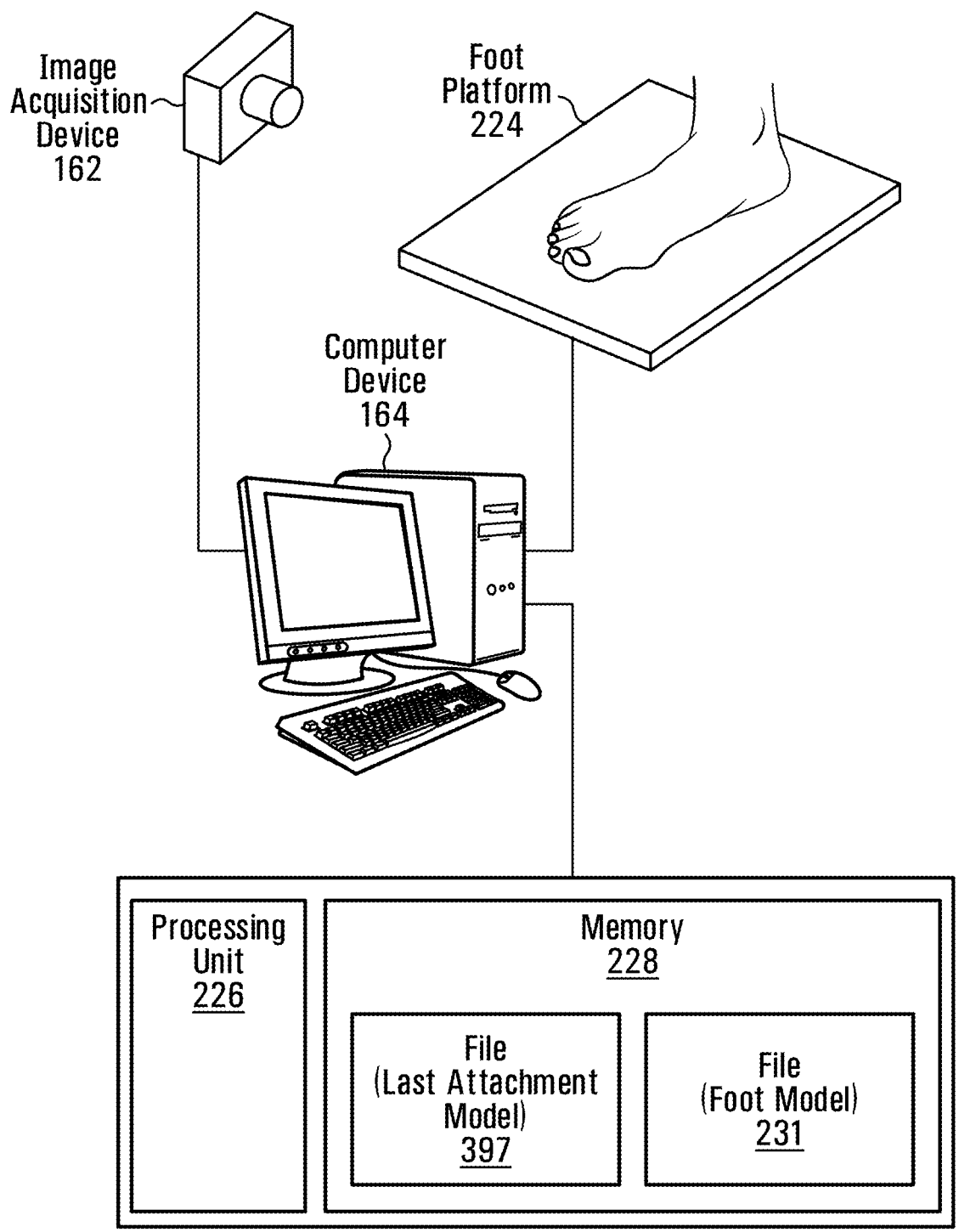
FIG. 2 is a block diagram showing components of a system, including a computing device, for acquiring an image of a wearer's foot, according to an example non-limiting embodiment.

FIG. 2 shows an image acquisition device 162 configured to capture images of a wearer's foot 230. The image acquisition device 162 is operatively connected to or integral with a computing device 164. In some embodiments, the computing device 164 may be implemented as a tablet, smartphone, phablet or laptop, and the image acquisition device 162 may be implemented as a camera integrated with the computing device 164. In other embodiments, the image acquisition device 162 may be embodied as a specialized external scanning hardware attachment (e.g., scanning gun). An optional specialized foot platform 224 may also be provided in some embodiments so as to provide a common reference for the captured images. For example, the foot platform 224 may be generally transparent with visible markers thereon, or it may include a touch-sensitive surface, to name a few non-limiting possibilities.

While it is envisaged that the user of the computing device 164 may be a retail or sales specialist and that the wearer may be someone other than the user of the computing device 164, it is possible for the user of the computing device 164 to be the actual wearer, such as in a case where the computing device 164 is part of a self-scanning station at a store, for example.

Continuing to refer to FIG. 2, the computing device 164 may comprise a processing unit 226 and a memory 228. The memory 228 may store instructions executed by the processing unit 226 in order to carry out a plurality of processes including operating system processes and applications.

In one embodiment, the image acquisition device 162 acquires images (such as 2D images) of the foot 230 which are processed by an application (e.g., a photogrammetry application) running on the computing device 164 in order to create 3D model data representative of the wearer's foot 230. In one embodiment, the "3D model data representative of the wearer's foot 230" refers to data (such as points or voxels in a 3D coordinate system) that defines a "model" of the foot 230, a model being a construct in virtual 3D space. For example, the 3D model data representative of the wearer's foot 230 can be stored in the memory 228. This 3D model data may include parameters stored as part of a computer-readable file 231 having a certain standardized format to allow downstream viewing and manipulation by a 3D modeling application. In some cases this could be achieved by specifying only those points that represent the outer surface (contour) of the wearer's foot 230. In a non-limiting example, the format of the file can be a 0.3DM file format (Rhinoceros file format), although other file formats are possible, such as .AI, .DWG, .PRT and .DXF, to name a few non-limiting possibilities. The use of 3D model data allows the faithful reproduction of various 3D shapes in a graphical or physical medium. To take a non-limiting example, when the file 231 that stores the 3D model data representative of the foot 230 is stored in a 0.3DM file format, for example, this allows a 3D modeling application to produce on-screen images that faithfully reproduce the appearance of the shape of the foot 230. Other standardized file formats may facilitate interpretation by a CNC machine or 3D printer, allowing the reproduction, in a physical medium, of the shape of the foot 230.

Figure 3A:
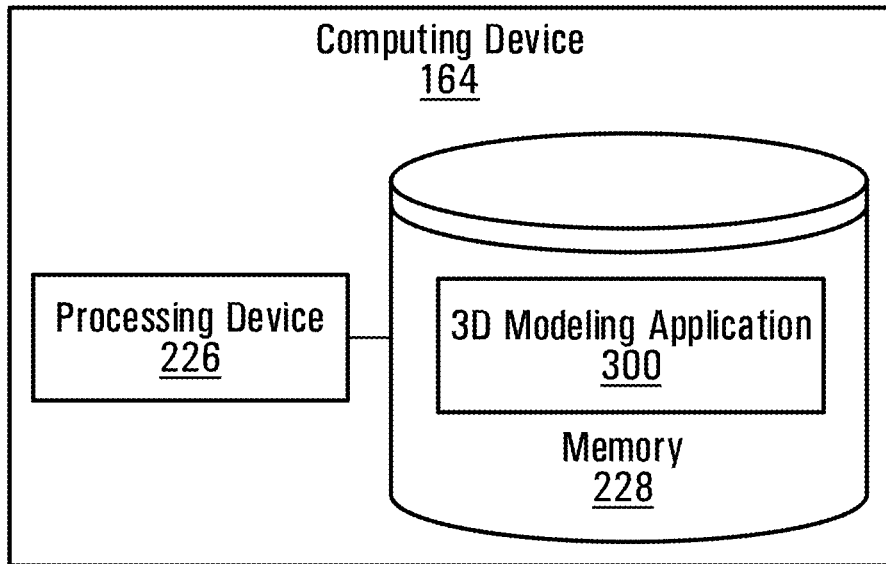
FIGS. 3A and 3B are block diagrams showing variants of the computing device.

Step 110: Determine at Least One "Last Attachment Feature" Based on Computer Processing of the 3D Model Data Representative of the Wearers Foot In some embodiments, this step may be carried out using the computing device 164, i.e., the same computing device that obtains the 3D model data representative of the wearers foot 230. With reference to FIG. 3A, the computing device 164 may comprise the processing unit 226 and the memory 228 as previously described. The memory 228 may store instructions executed by the processing unit 226 in order to carry out a plurality of processes including operating system processes and applications.

Figure 3B:
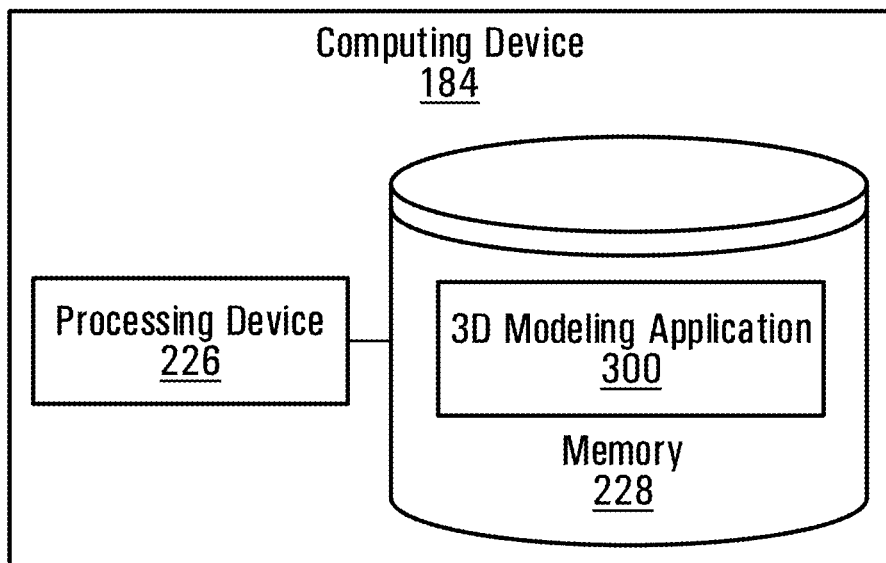

In other embodiments, step 110 may be carried out using the second computing device 184, which may be located at a remote skate design and/or manufacturing facility 180. With reference to FIG. 3B, the computing device 184 may comprise a processing unit 326 and a memory 328 connected thereto. The memory 328 may store instructions executed by the processing unit 326 in order to carry out a plurality of processes including operating system processes and applications.

One example of an application that may be carried out by the processing unit 226/326 includes a "3D modeling application" 300, i.e., an application for generating and manipulating 3D model data representative of various objects, and displaying them on a 2D screen. One example of a suitable 3D modeling application may be based on, or an extension of, Rhino™, sold by Robert McNeel & Associates, Seattle, Wash. Another example of a suitable 3D modeling application may be based on, or an extension of, Creo™, a CAD software package available from PTC, Needham, Mass. The 3D modeling application 300 may be specialized for human anatomical structures and feet in particular.

Figure 3C:
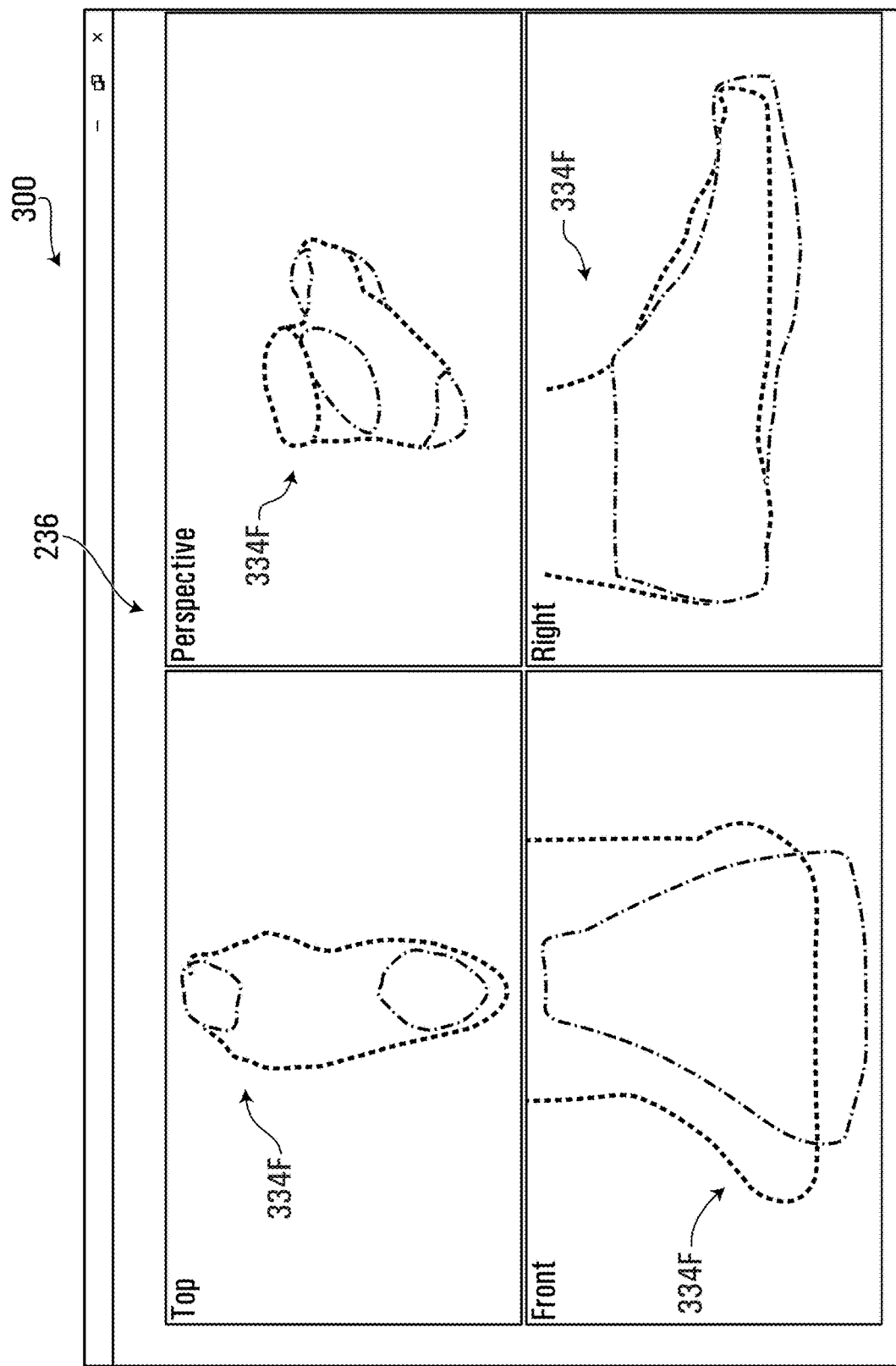
FIG. 3C is an image of the shape of a foot displayed from multiple angles and generated by a 3D modeling application.

Turning now to FIG. 3C, there is shown an example image 334F, rendered in two dimensions (e.g., for display on a screen from a selected angle/perspective). The image 334F evokes the shape of the foot 230. The image 334F may be generated by the 3D modeling application 300 as it interprets the 3D model data representative of the foot 230, such data having been stored in the computer-readable file 231. The user of the computing device 164/184 may instruct the 3D modeling application 300 to change display perspectives so as to result in different images being displayed on the screen. This can be done by providing commands through interaction with a mouse, keyboard or touch-screen, for example. The 3D modeling application 300 recalculates a new angle/perspective and displays a new version of the image 334F. As will be seen below, the 3D modeling application 300 may be specially configured to allow the user to alter the image 334F and therefore make changes to the underlying 3D model data.

In an embodiment, the wearer may be allowed to keep his or her sock on during scanning. In that case, the 3D modeling application 300 may be configured to determine or estimate a thickness of the sock and to compensate for the thickness of the sock in generating the image 334F.

The 3D modeling application 300 may be further equipped with functionality to allow the user of the computing device 164/184 to annotate the image 334F. For example, the user of the computing device 164/184 may be allowed to enter text or graphics in association with a particular region of the image 334F (for example, to advise a downstream user of a special characteristic of the foot 230 or of a special request of the wearer regarding the particular region of the image 334F). Other metadata may also be included in association with the 3D model data representative of the foot 230 and added to the information in file 231, such as nominal skate size (1, 2, 3, . . . ), gender (M/F), desired tightness of fit (loose, medium, tight), as well as foot directionality (L/R), to name a few non-limiting possibilities.

Figure 3D:
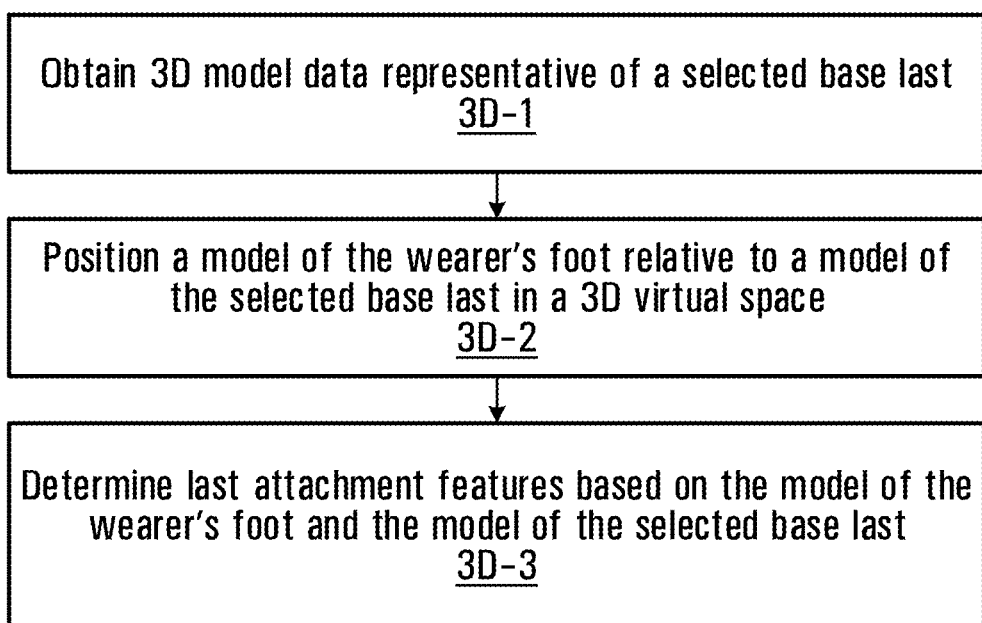
FIG. 3D is a flowchart showing sub-steps in a process for determining and obtaining last attachment features.

At this point, the process continues with reference to FIG. 3D, which shows various sub-steps leading to determining/obtaining the so-called "last attachment features":

Step 3D-1: Obtain 3D Model Data Representative of a Selected Base Last

At step 3D-1, 3D model data representative of a selected base last is obtained. In an embodiment, and with reference to FIG. 3J, a database 399 stores files 398 containing 3D model data representative of the base lasts 190 that are available at the manufacturing facility 180. The database 399 may be part of the memory 328 of the computing device 184 and/or it may be accessible over the data network 163. In some cases the files 398 may specify only those points that represent the outer surface (contour) of the base lasts 190. In a non-limiting example, the format of the file can be a .3DM file format (Rhinoceros file format), although other file formats are possible, such as .AI, .DWG, .PRT and .DXF, to name a few non-limiting possibilities.

Selection of an appropriate base last can be left up to the user of the computing device 164/184 and/or a computer-assisted "wizard" may be provided for this purpose. For example, the wizard may suggest a base last that is the closest, in terms of its dimensions, to those of the wearer's foot 230 without exceeding them. This closeness can be evaluated by a comparison of the 3D model data representative of the base lasts 190 and the 3D model data representative of the foot 230.

In other cases, the wizard itself may be configured to automatically make a selection of the base last based on certain parameters or features of the wearer's foot 230 and/or metadata (e.g., nominal skate size (1, 2, 3, . . . ), gender (M/F), degree of tightness, as well as foot directionality (L/R) and possibly even annotations) that accompanies the 3D model data representative of the foot 230. For the purposes of the below discussion, let the selected base last be base last 190A.

Figure 3E:
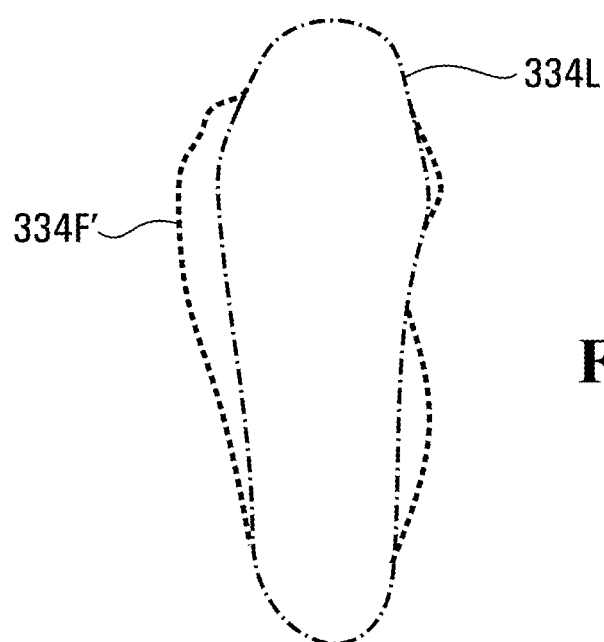
FIGS. 3E and 3F are images of a model of a foot superposed with a model of a base last, according to various example non-limiting embodiments.

Step 3D-2: Position a Model of the Wearer's Foot Relative to a Model of the Selected Base Last in a 3D Virtual Space As mentioned earlier, the "model" of the foot 230 is a construct, in virtual 3D space, defined by the 3D model data representative of the wearer's foot 230. Analogously, the "model" of the selected base last 190A is a construct, in virtual 3D space, defined by the 3D model data representative of the selected base last 190A. At step 3D-2, the model of the foot 230 is positioned relative to the model of the selected base last 190A in the 3D virtual space. Practically speaking, step 3D-2 may involve a user of the computing device 164/184 instructing the 3D modeling application 300, which has loaded the file 231 that includes 3D model data representative of the wearer's foot 230, to open or import the file 398 that includes the 3D model data representative of the selected base last 190A. The reverse may also be done. Step 3D-2 may also be executed automatically by the 3D modeling application 300 when either file is opened or imported. FIG. 3E is an example 2D output of the 3D modeling application 300 taken from a given perspective/angle, wherein the model of the foot 230 is represented by an image 334F' and the model of the base last 190A is represented by an image 334L. The two images are superposed onto one another by an amount that depends on the distance between the two models in the virtual 3D space.

Step 3D-3: Determine last attachment features based on the model of the wearer's foot and the model of the selected base last At step 3D-3, "last attachment features" are determined based on the model of the wearer's foot 230 and the model of the selected base last 190A. The "last attachment features" define volumetric changes (additions) to be made to the selected base last 190A in order to customize the base last 190A. There are numerous embodiments for determining the last attachment features, two of which are now described.

Embodiment #1

In a first non-limiting embodiment, the "last attachment features" may include the specification dimensions of one or more physical last attachments to be produced. A computer-readable file 398 containing these dimensions may be created and stored in the database 399 or other storage medium in association with an identification (e.g., name) of the wearer, for future reference.

One way to obtain the specification/dimensions of one or more physical last attachments to be produced is to add volume to the model of the selected base last (substep 3D-3-A). The computing device 164/184 keeps track of such volumetric additions, and may allow further thickening or thinning out various regions (substep 3D-3-B). The computing device 164/184 may also allow the addition of protrusions or hooks to assist in a better fit with the selected base last 190A (substep 3D-3-C). This is now described in greater detail.

Substep 3D-3-A

This sub-step involves volumetric additions to the model of the selected base last 190A in one or more regions within the virtual 3D space. This can be done by manipulating the model of the selected base last 190A via interactions with the computing device 164/184. The 3D modeling application 300 is configured to allow such manipulations. As shown, the image 334L of the model of the selected base last 190A (see FIG. 3E) is manipulated by the user to result in a new image 334C (see FIG. 3F). This can be done from multiple different perspectives/angles, so that the resulting change in volume within the virtual 3D space can be accurately established (e.g., by photogrammetry). The resultant model defined by the modifications to the 3D model data representative of the selected base last 190A can be referred to as a "customized last model". Its existence is virtual and is digitally encoded in the computing device 164/184. The customized last model is not expected to represent the dimensions of any of the already available physical base lasts 190 in inventory (otherwise, there would be little need for customization).

In an embodiment, the 3D modeling application 300 may allow images of the model of the selected base last 190A (such as image 334L) to be modified from multiple angles/perspectives until a satisfactory "fit" is achieved. Those skilled in the art will understand that what constitutes a satisfactory fit may depend on operational requirements. For example, in some cases it may mean that the customized last model resulting from volumetric additions to the model of the selected base last 190A faithfully reproduces the shape of the wearer's foot 230. In other circumstances, it may mean that the customized last model has the general shape of the wearer's foot 230 but is somewhat larger in volume, so as to achieve a looser fit for the skate, depending on the production material to be used.

Figure 3F:
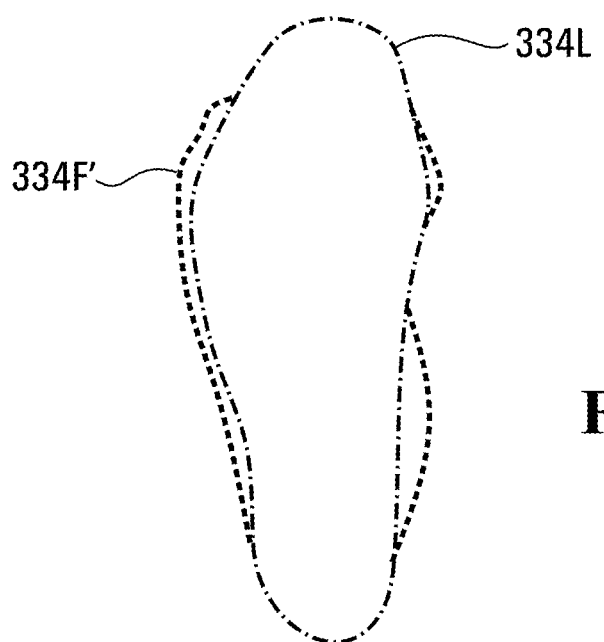

In still other circumstances, it may mean that the customized last model has the general shape of the wearer's foot 230 but is somewhat smaller in volume, so as to achieve a tighter fit for the skate. This latter situation may be manifested in the 3D modeling software as "interference" between the customized last model and the model of the wearer's foot 230, and may be particularly appropriate where the skate inner liner is compressible or when it is envisaged that the skate may be further thermoformable by the user to a pre-determined extent (i.e., user may heat the equipment up to a certain temperature to partially or entirely reform the liner to a shape of its choice, e.g.; to correspond to his/her foot). By way of non-limiting example, and as seen in FIG. 3F, the model of the selected base last 190A may be manipulated beyond its original dimensions, but does not exceed the dimensions of the foot 230, i.e., the image 334C of the customized last model interferes with the image 334F' of the foot 230 (i.e., the customized last will have certain dimensions that are smaller than those of the foot 230).

In still other cases, a satisfactory fit is deemed to have been achieved if the customized last model is somewhat larger in volume than the wearer's foot 230 in some areas and somewhat smaller in others.

In these various embodiments, the system will know when a satisfactory fit has been achieved either when the user so indicates, or when a condition is satisfied, such as when a predefined amount of interference is reached.

Figure 3G:
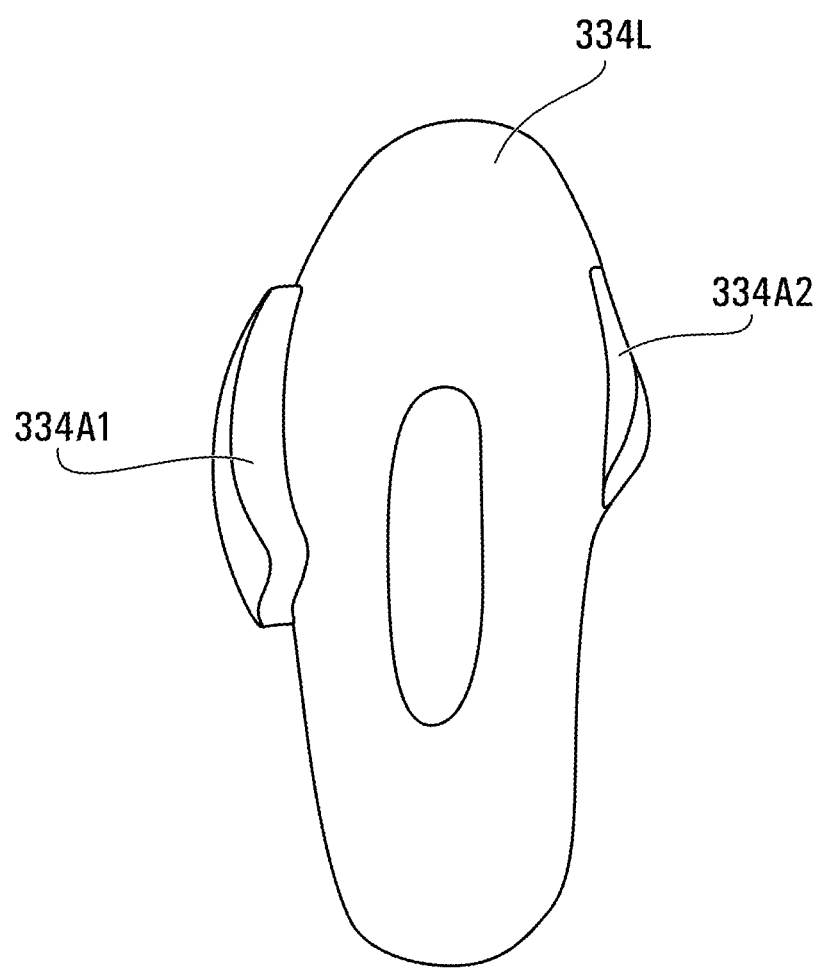
FIG. 3G is an image of the model of the base last augmented with images of last attachment models.
Figure 3H:
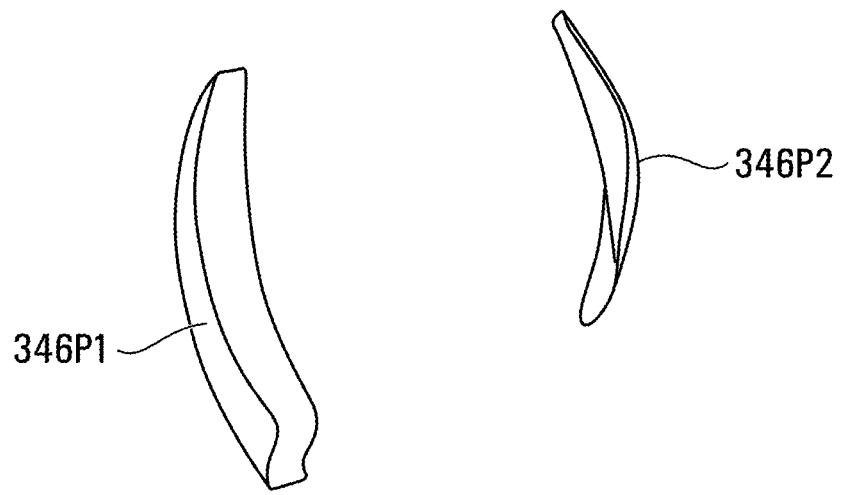
FIGS. 3H and 3I are images of last attachment models according to various example non-limiting embodiments.

The construct in the virtual 3D space created by the aforementioned volumetric additions to the model of the selected base last 190A may be referred to as a "last attachment model" (or "last attachment models" if there is more than one construct), and may be represented by its own corresponding 3D model data, which may be stored as a file 397 in the memory 228/328. By way of non-limiting example, FIG. 3G shows an image which is basically the image 334L of the base last 190A (as seen in FIG. 3E) augmented with images 334A1, 334A2 of two last attachment models, taken from a particular perspective/angle of the virtual 3D space. FIG. 3H shows more clearly the images 334A1, 334A2 of the last attachment models.

It will be understood that an equivalent way to obtain the 3D model data representative of the last attachment model(s) is by way of a volumetric subtraction between the customized last model and the model of the selected base last 190A, which leaves one or more 'islands" corresponding to at least one last attachment model.

Substep 3D-3-B

It is envisaged that there may be no particular constraints on the number of last attachment models, or the dimensionality of each last attachment model. However, in some cases the aforementioned volumetric additions could be relatively minor, resulting in last attachment models that are relatively "thin" in some areas. This may be impractical or undesirable for manufacturing purposes. As such, it is envisaged that in cases where the dimensionality (e.g., thickness over a certain connected area having at least a minimum size) of a particular last attachment model is deemed to be too "small" in a given region corresponding to a particular region of the base last 190A (e.g., having less than a pre-defined threshold thickness within the virtual 3D space), this may be detected by the 3D modeling application 300, which may indicate to the user that the last attachment model needs to be modified by the user in a specific region. In other embodiments, the 3D modeling application 300 may itself suggest changes that would allow the particular last attachment model to meet the dimensionality criteria, for example, a certain minimum thickness over a certain minimum connected area. In still other cases, where substep 3D-3-A led to the creation of multiple smaller last attachment models that are close to one another in the virtual 3D space, e.g., separated by no more than a certain maximum distance, the 3D modeling application may suggest (or carry out) fusing the nearby last attachment models into a joint last attachment model that includes a portion in a region of the virtual 3D space that was not originally covered by either last attachment model.

Substep 3D-3-C

Figure 3I:
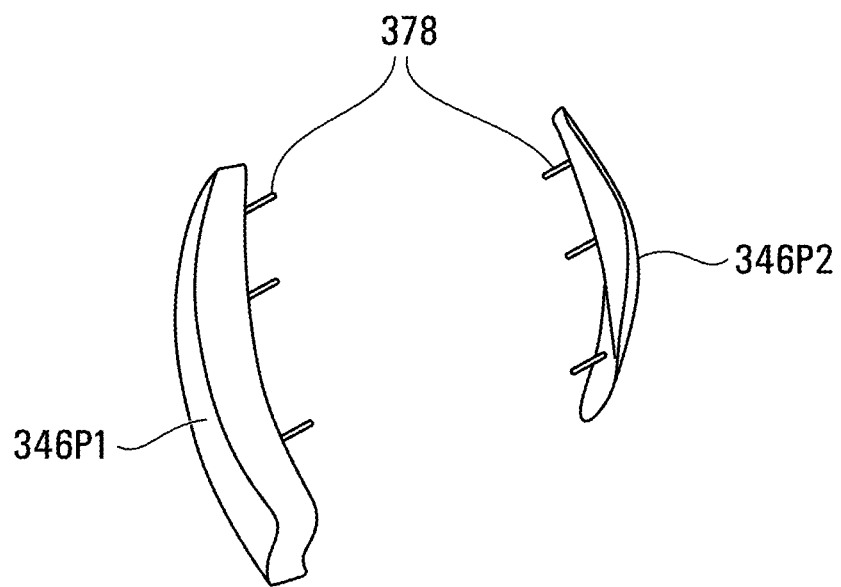
Figure 3J:
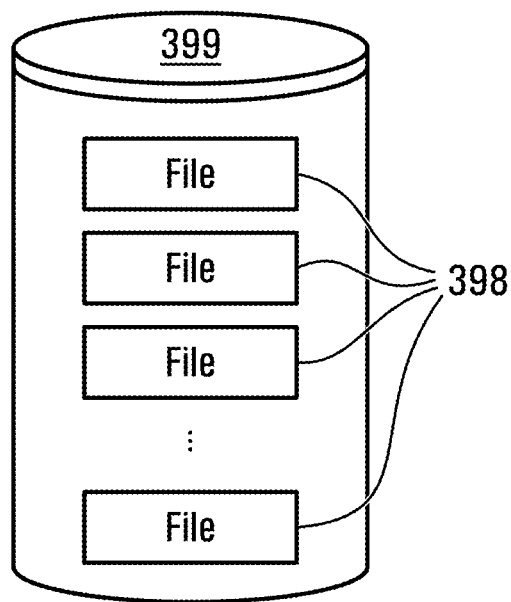
FIG. 3J shows a database for storing files containing 3D model data.

The 3D modeling application 300 may also be used for adding attachment facilitators (e.g., projections or hooks) to the last attachment models so as to register with corresponding recesses in the base last 190A, thereby facilitating the securing of the eventually constructed last attachments to the base last 190A (as described later on in the context of step 130). The projections may be constructed by the user through interaction with the 3D modeling application 300, or pre-configured projections can be associated with models represented by 3D model data stored in the memory 228/328. As such, desired projections can be selected from memory, and added to the last attachment models. By way of non-limiting example, FIG. 3I shows images 346P1, 346P2 which are 2D renderings of last attachment models including projections 378 for eventual insertion into corresponding recesses of the base last 190A, taken from a particular perspective/angle of the virtual 3D space. The projections 378 can have any suitable shape and size, and there is no particular limitation on the number of projections 378 that may be added in this way. It is also possible for the model of the selected base last 190A to have projections and for the last attachment models to have recesses.

It should be appreciated that the 3D model data representative of the at least one last attachment model, as obtained at substep 3D-3-A will undergo modifications at substeps 3D-3-B and 3D-3-C, resulting in final 3D model data, which specifies the desired dimensions of one or more physical last attachments to be produced. These desired dimensions can be referred to as the "last attachment features" and define a desired volumetric addition to be made to the selected base last 190A in order to customize it. A computer-readable file 397 containing the last attachment features may be stored in the memory 228/328 or other storage medium in association with an identification (e.g., name) of the wearer, for future reference.

In a possible variant, the computing device 164/184 may perform elements of substeps 3D-3-A to 3D-3-C automatically, i.e., algorithms for determining the extent of the interference and determining the resulting number of last attachment models and their dimensions may be pre-programmed or learned by artificial intelligence based on a history of manual manipulations by the user.

Embodiment #2

In a second non-limiting embodiment, the "last attachment features" may include an identification (e.g., code or serial number) of one or more pre-existing physical last attachments 194 that may be stored in inventory 196. In this case, there may be multiple approaches to arrive at the right code or serial number, two of which are now described.

Approach #1

Figure 3K:
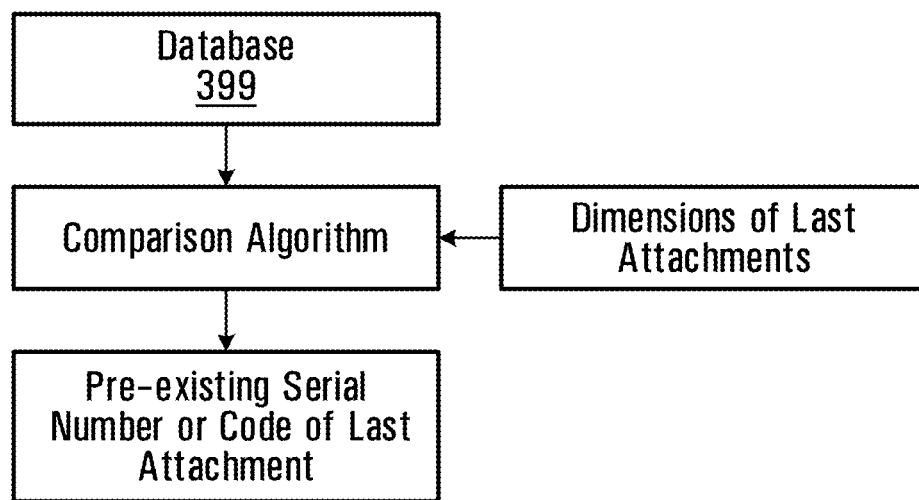
FIG. 3K is a block diagram showing the use of a comparison algorithm for matching desired last attachment dimensions with dimensions of existing last attachments in a database.

According to a first non-limiting approach, the desired dimensions of one or more physical last attachments to be produced are obtained exactly as in substeps 3D31-A to 3D-3-C. Thereafter, the computing device 164/184 executes a matching process whereby these desired dimensions are compared to those of the pre-existing last attachments 194 in the inventory 196 of last attachments in order to make a selection. The dimensions of the pre-existing last attachments 194 may be stored in respective files 398 in the database 399. In this regard, FIG. 3K helps illustrate the use of a comparison algorithm to achieve this goal. The comparison algorithm can carry out a parameter-space comparison of the dimensions of the last attachment model and corresponding dimensions of the last attachments in the inventory 196. Examples of types of dimensions suitable for comparing can include width, height and length, as well as a non-linear/multivariate characterization of volume. An objective function can be defined as proximity between the dimensions, which may be weighted differently for different dimensions. The comparison algorithm may be designed to select one of the pre-existing last attachments 194 whose dimensions minimize the objective function. The serial number or code corresponding to the selected pre-existing last attachment can be referred to as the "last attachment features" according to this approach.

Approach #2

According to a second non-limiting approach, models of the pre-existing last attachments 194 are obtained by the computing device 164/184 (e.g., files 398 in the database 399), and the computing device 164/182 may constrain the user's volumetric additions to correspond only to shapes of the models of the pre-existing last attachments (and therefore to shapes of the pre-existing last attachments 194). The user can then arrive at a final selection of models of pre-existing last attachments that achieve as close a match as possible to a desired fit. The serial number or code corresponding to the selected pre-existing last attachments can be referred to as the "last attachment features" according to this approach. It should be appreciated that this approach may reduce the need to manufacture new last attachments.

Step 120: Obtain the at Least One Last Attachment

Figure 4:
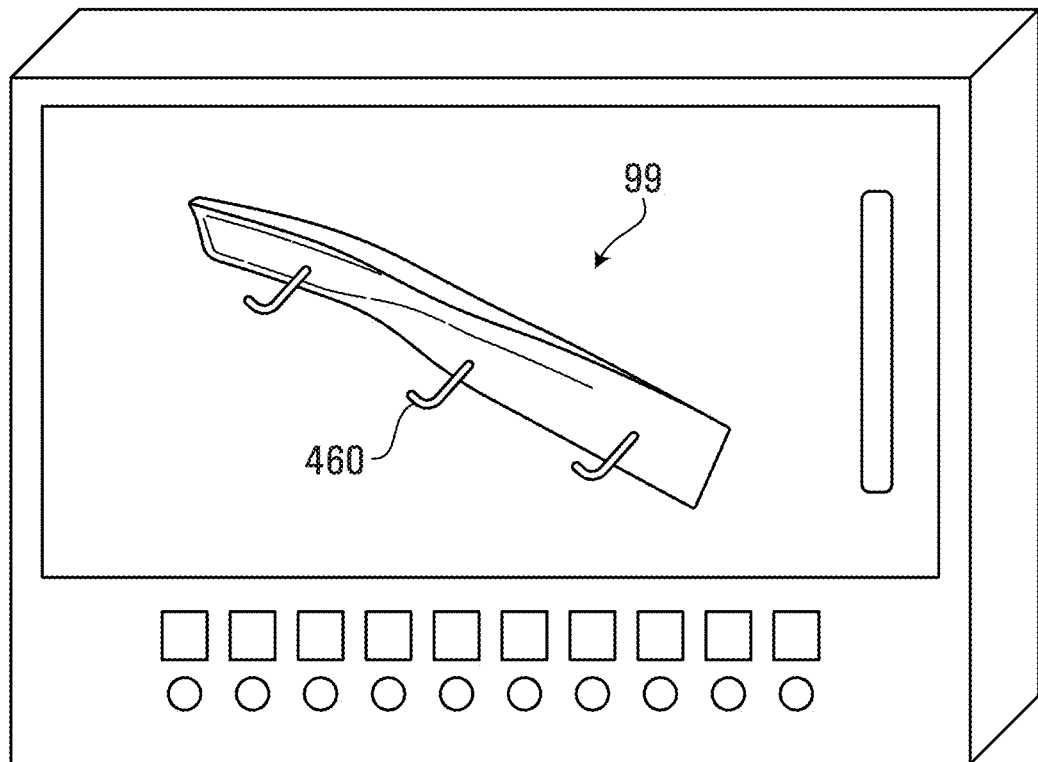
FIG. 4 is a diagram showing manufacturing equipment used in the creation of last attachments, according to an example non-limiting embodiment.

If the "last attachment features" determined at step 110 include the desired dimensions of one or more physical last attachments to be produced, then step 120 includes producing the physical last attachments by way of a manufacturing technique, such as milling, 3D printing or laminating. With reference to FIG. 4, there is shown the creation of the last attachments 99 using manufacturing equipment 182. Different materials for the last attachments 99 may be used, depending on the technique used to produce them. For example, for last attachments that are milled, they may be comprised at least partially of wood, MDF (medium density fiberboard) or plastic, to name a few non-limiting possibilities. For last attachments that are 3D printed, they may be comprised at least of ABS, nylon or polypropylene, to name a few non-limiting possibilities. For last attachments that are laminated, they may be comprised at least in part of leather or synthetic leather, to name a few non-limiting possibilities. It will be appreciated that the last attachments 99 may include built-in projections 460 (which correspond to the projections 378 visible in the images 334P1, 334P2 in FIG. 3I) to facilitate attachment to corresponding attachment points in the base last 190A.

Alternatively, if the "last attachment features" determined at step 110 include a code or serial number of one or more pre-existing physical last attachments 194 stored in the inventory 196, then step 120 includes retrieving the corresponding last attachments 99 from the inventory 196.

It should be appreciated that in some cases, when there are multiple last attachments, they may include a combination of pre-existing and custom-created last attachments.

Step 130, Attach the at Least One Last Attachments to the Base Last

Figure 5A:
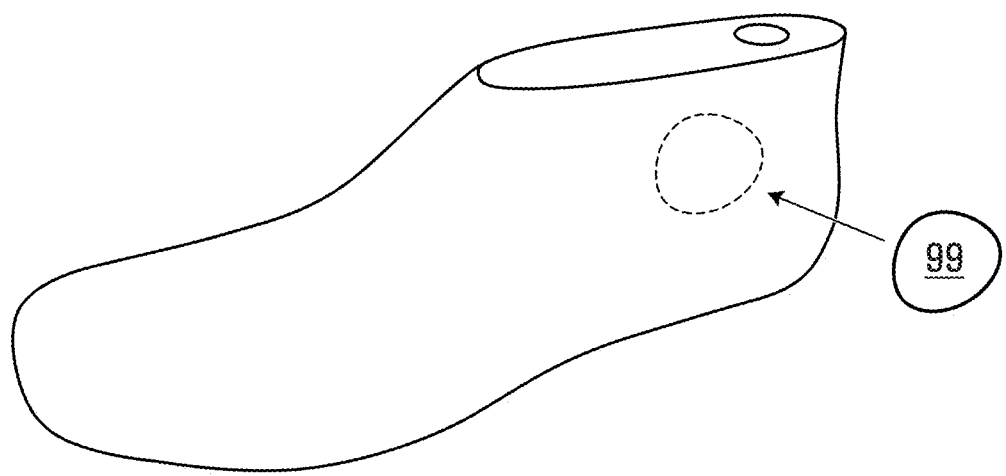
FIGS. 5A and 5B are perspective images of a base last with last attachments, according to various example non-limiting embodiments.

Once the at least one last attachment 99 has been obtained for a given base last 190A (i.e., manufactured or retrieved from inventory), the at least one last attachment 99 can be attached to the base last 190A to create a custom last 550 (see FIG. 1E). This can be achieved in a variety of ways. For example, as shown in FIG. 5A, the at least one last attachment 99 may be glued to the base last 190A to create the custom last 550. The base last 190A may include markers where the at least one last attachment 99 is to be glued.

Figure 5B:
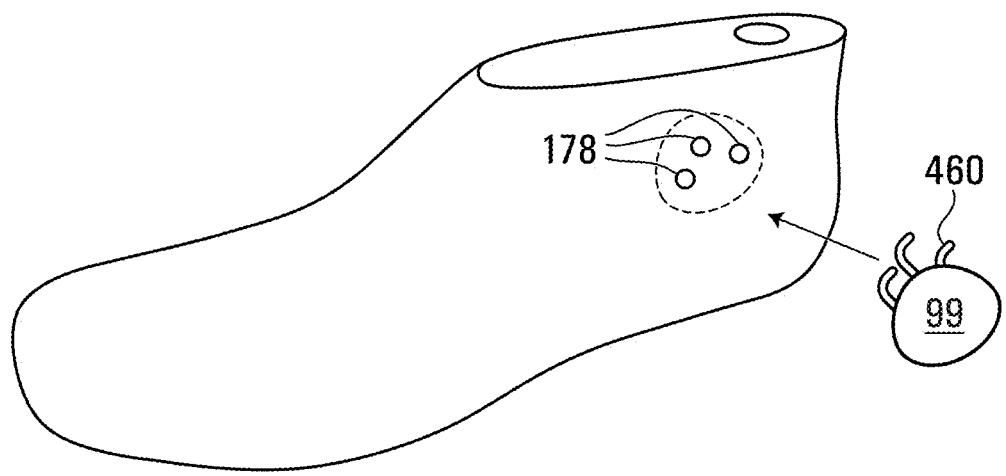

As has been mentioned, the at least one last attachment 99 may have special areas with built-in projections 460. As shown in FIG. 5B, the at least one last attachment 99 may be "plugged into" (or otherwise mated with) the attachment points (e.g., recesses 178) in the base last 190A to create the custom last 550. In a complementary embodiment, the at least one last attachment 99 may be provided with recesses and it is the base last 190A that has projections.

Clearly, other techniques may be used for securing the at least one last attachment 99 onto the base last 190A to create the custom last 550.

Also, in some embodiments, where there are plural last attachments 99, at least one of the last attachments 99 is designed to be attached to another one of the last attachments 99. In other cases, at least one of the last attachments 99 is designed to be attached to both the base last 190A another one of the last attachments 99. As such, the custom last 550 may be created using layers of last attachments 99, the design of which can be taken into account during the above described modeling process.

Step 140: Produce the Customized Skate

Figure 6:
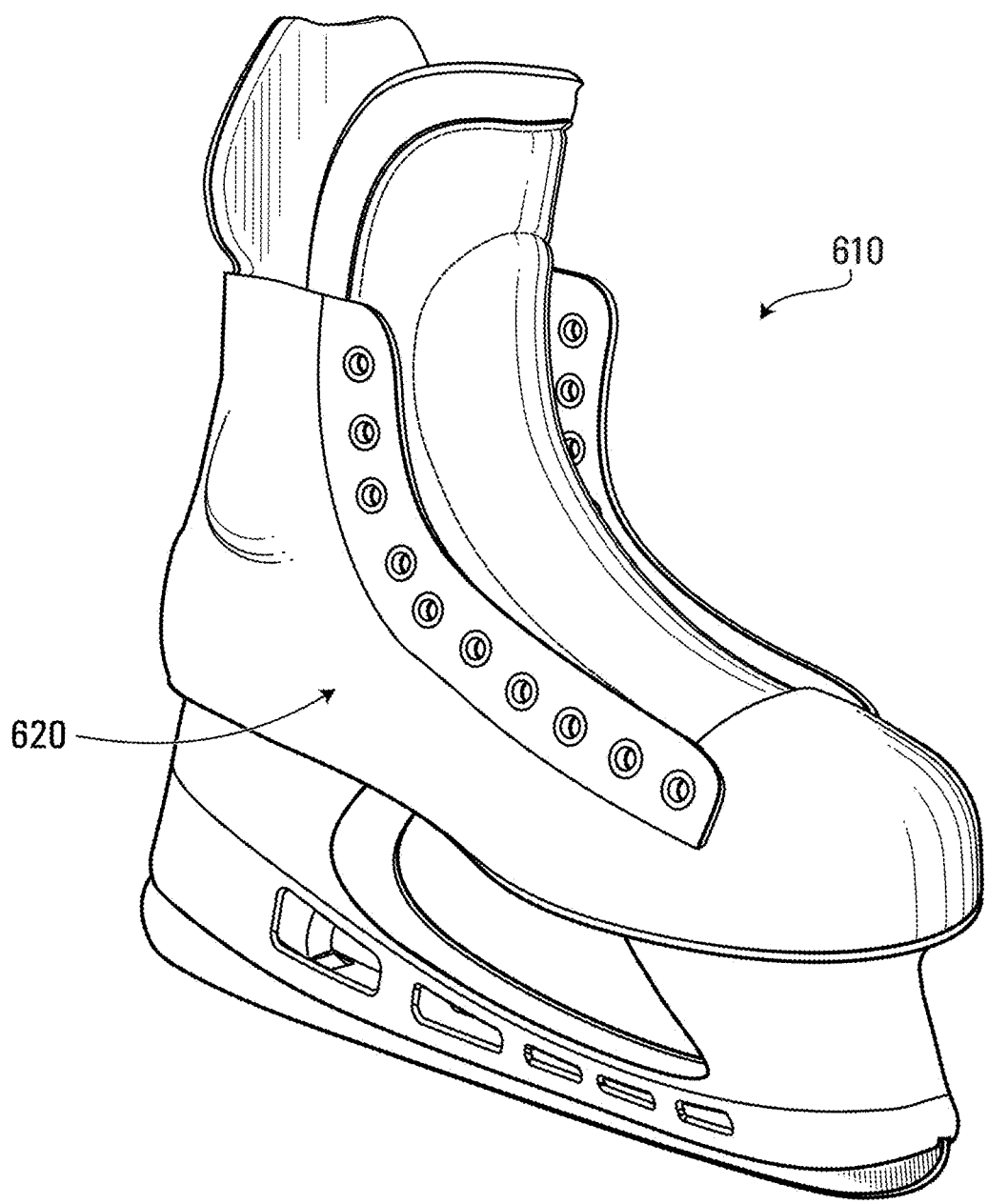
FIG. 6 is a perspective view of a customized ice skate according to an example non-limiting embodiment.

The outcome of having attached the at least one last attachment 99 to the base last 190A is the creation of the custom last 550. With reference to FIG. 6, the skate boot manufacturing process then involves producing a customized skate boot 610 using production material 620 (e.g., quarter material together with interior padding and lining also in place) shaped according to the custom last 550. For example, this may involve:

Heating the skate and lasting the heel area around the custom last 550 and securing the quarter material 620 to the insole with nails. The quarter material 620 then takes the shape of the custom last 550 around it;

Doing the same with the arch and forefoot area;

Smooth sanding the bottom part of the skate to remove any fold and voids;

Attaching an outsole with glue and pressing it in place.

Step 150: Removing the at Least One Last Attachment from the Customized Last

Once the skate boot 610 has been shaped, the custom skate boot 610 is separated from the custom last 550. The skate boot 610 is then finalized by the following steps:

Drilling holes through the bottom of the skate to attach the blade holder/blade assembly;

Attaching the blade holder/blade assembly with rivets (e.g., steel and/or copper);

Lacing and cleaning.

It is noted that the customized skate boot 610 may also include a tongue attached to a toe cap, which is attached to the quarter (boot).

With the custom last 550 separated from the custom skate boot 610, the at least one last attachment 99 may be removed from the custom last 550. For example, in the case of last attachments that were glued onto the base last 190A (as in FIG. 5A), a solvent may be applied to unglue the last attachments from the base last 190A. In the case of last attachments that were "plugged into" the base last 190A (as in FIG. 5B), removal of the last attachments could involve "unplugging" the last attachments from the base last 190A. This leaves behind the physical base last 190A as well as the at least one last attachment 99.

It should be appreciated that the last attachments 99 may or may not be reusable. They last attachments 99 may be non-reusable because they are worn out or simply because they are so customized to the wearer than no other individual is expected or likely to make use of them. However, the base last 190A, which may be made of a more durable or expensive material, may be reusable for other lasting operations, which can be a significant cost efficiency for the manufacturer.

Various elements of the process described above may be applicable to the production of other wearable equipment using lasts.

Variant 2: Customization Using A Mold

Figure 14:
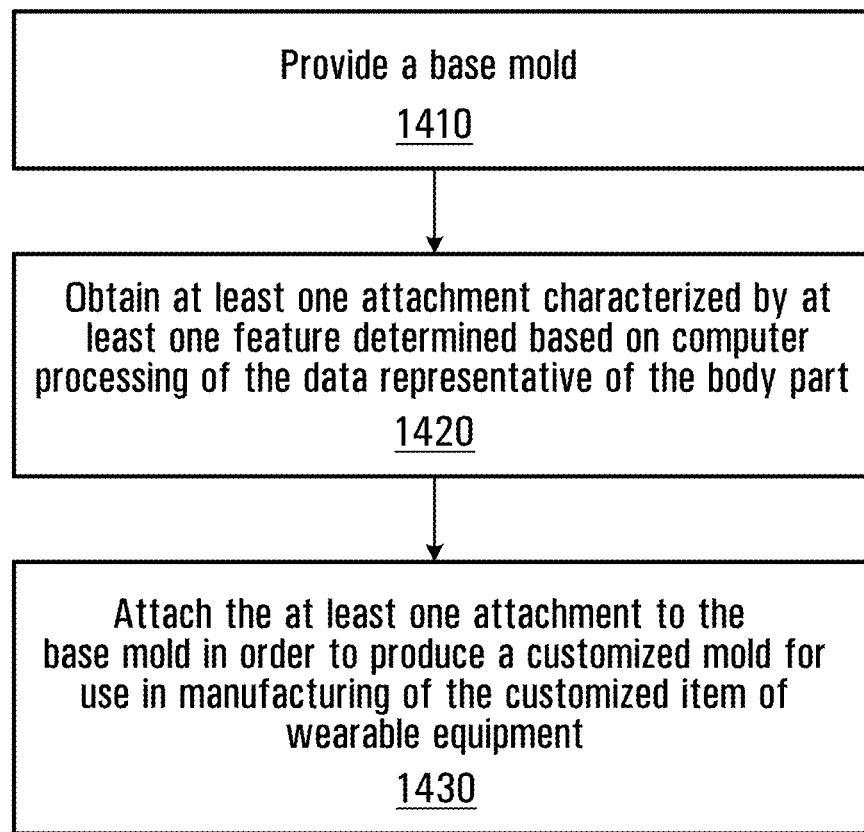
FIG. 14 is a flowchart showing steps in a process for producing a customized mold; according to an example non-limiting embodiment.

With reference now to FIG. 14, a second variant of the non-limiting example process or method for production of customized wearable equipment may involve providing a base mold (step 1410) and obtaining at least one attachment (step 1420). Each attachment may be characterized by at least one feature determined based on computer processing of data representative of the body part, which is obtained from a file and/or collected during a prior step (e.g., by scanning the body part). This variant of the process further includes attaching the at least one attachment to the base mold in order to produce a customized mold for use in manufacturing of the customized item of wearable equipment (step 1430).

Figure 12A:
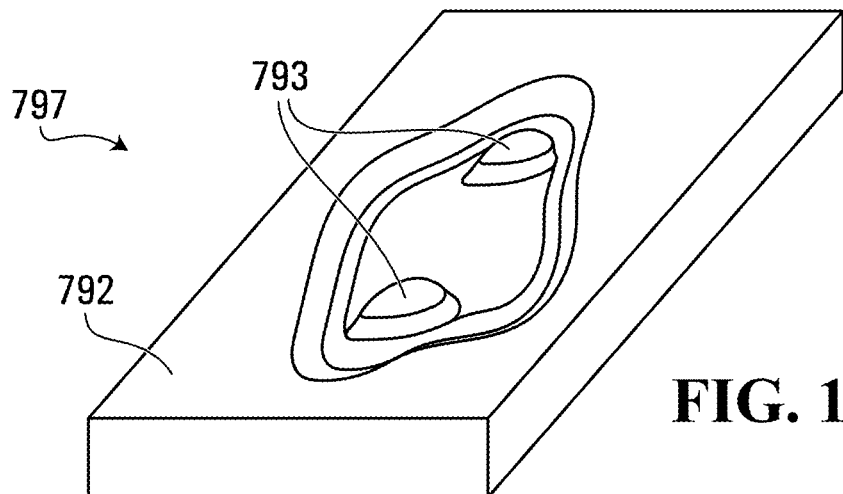
FIGS. 12A and 12B are perspective views of a customized mold, according to various example non-limiting embodiments.

As a result, and as shown in FIG. 12A, for example, there will be produced a customized mold 797 for producing a customized item of wearable equipment for a body part. The customized mold 797 includes a base mold 792 and at least one attachment 793 attached to the base mold. As stated above, each of the at least one attachment is characterized by at least one feature determined based on computer processing of data representative of the body part.

In a specific non-limiting embodiment, the customized mold can then be used to produce a customized liner for a hockey goaltender mask or for other wearable equipment.

Figure 7A:
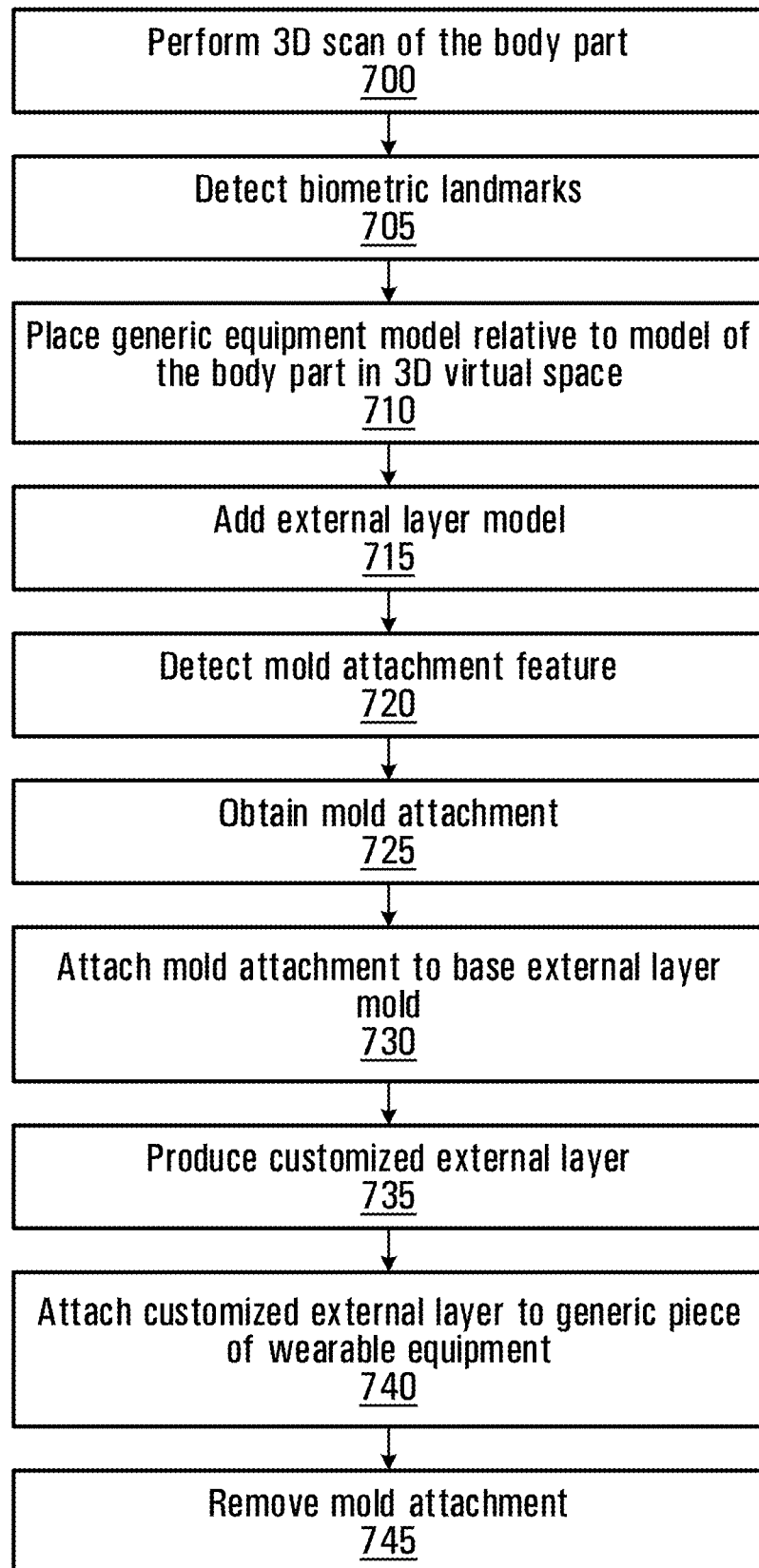
FIG. 7A is a flowchart showing steps in a process for creating a customized item of wearable equipment using a customized mold, according to an example non-limiting embodiment.

Accordingly, this second variant of the process may involve a subset or all of the following steps shown in FIG. 7A:

Step 700: Perform a 3D scan of the body part of the wearer (e.g., foot, face, skull, etc.), thereby to obtain 3D model data representative of the wearer's body part.

Step 705: Detect biometric landmarks in the model of the wearer's body part.

Step 710: Place a generic or standard equipment model relative to the model of the wearer's body part in virtual 3D space.

Step 715: Create a "desired external layer" model between the generic or standard equipment model and the model of the wearer's body part. This could be a desired liner model, for example.

Step 720: Determine at least one "mold attachment feature", so that a customized mold made from a "base external layer mold" to which attachments having such features are appended would produce a customized external layer that is represented in virtual 3D space by the desired external later model.

Step 725: Obtain the at least one mold attachment.

Step 730: Attach the mold attachment to the base external layer mold, thereby to produce a customized external layer mold.

Step 735: Produce a customized external layer from the customized external layer mold.

Step 740: Attach the customized external layer to a standard or generic piece of wearable equipment (e.g., a goalie mask shell) that is represented in virtual 3D space by the generic equipment model, thereby to produce a customized piece of wearable equipment. The customized piece of wearable equipment is now ready to be delivered to/worn by the wearer.

Step 745: Optionally, remove the at least one mold attachment from the customized external layer mold, thus leaving behind the base external layer mold.

The use of a standard or generic piece of wearable equipment (such as a goalie mask shell) and a customized external layer (produced using a customized mold that is itself made up of a base mold and at least one "mold attachment") as described above may render the mass customization of wearable equipment more rapid and/or economically feasible for the manufacturer, while the wearer may benefit from the use of equipment customized to their body's individual morphology.

Figure 7B:
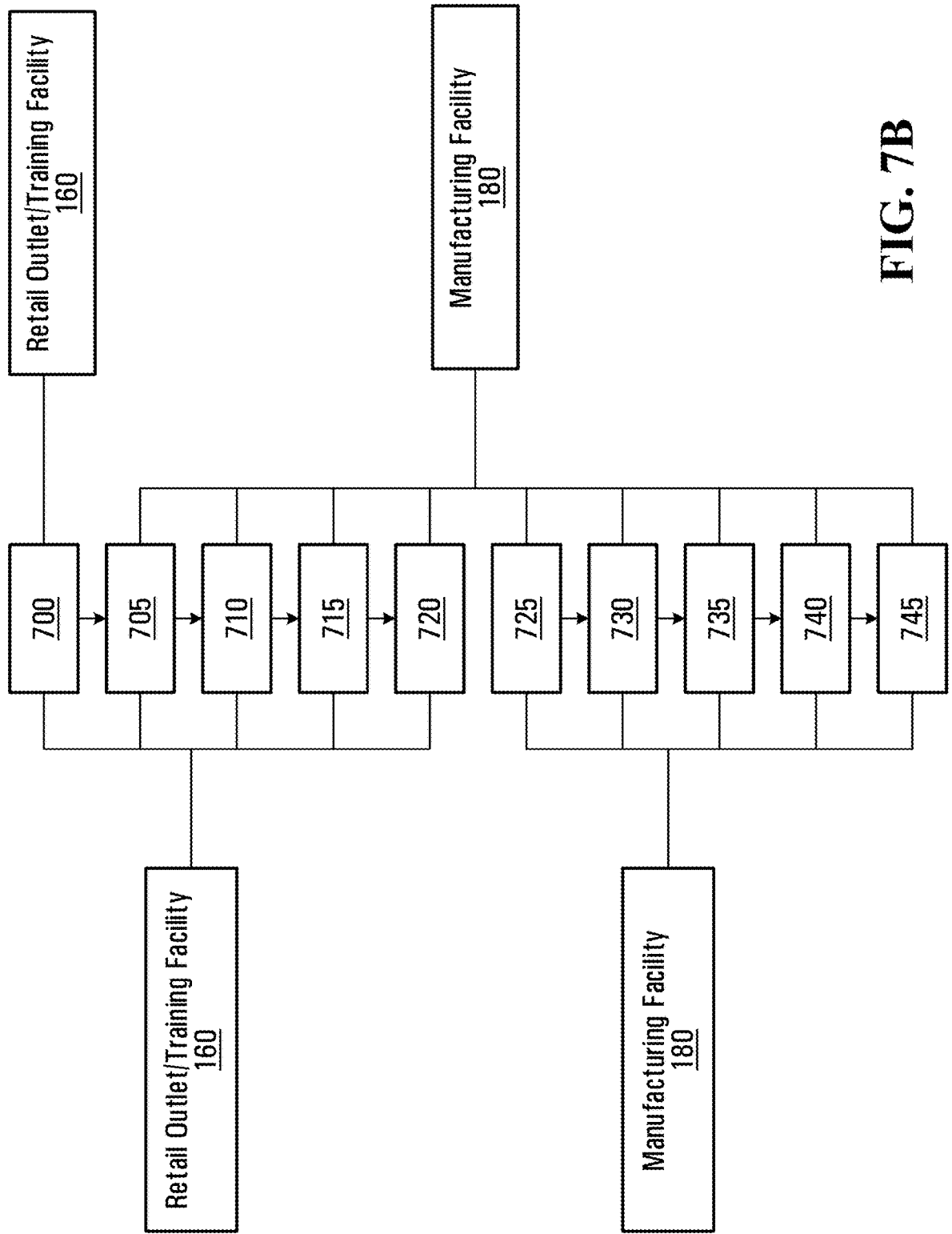
FIG. 7B is a block diagram showing various possibilities for execution of the process FIG. 7A.

Those skilled in the art will appreciate that the various steps in the example process may be carried out by different entities and in different locations. For example, and with reference to FIG. 7B, according to a first approach, steps 700 through 720 may be carried out at the aforementioned retail outlet or training facility 160 using the aforementioned image acquisition device 162 and computing device 164, and steps 725 through 745 may be carried out at the aforementioned manufacturing facility 180 using manufacturing equipment 182. Alternatively, according to a second approach, step 700 may still be carried out at the retail outlet or training facility 160 using the image acquisition device 162 and the computing device 164, but the remaining steps (705 through 745) are all carried out at the manufacturing facility 180.

In another embodiment, shown previously in FIG. 10, the image acquisition device 162 and the computing device 164 are not located at the same facility. Rather, these entities are remote from one another and communicate over a data network 163 such as the internet or a private LAN. This may involve the transmission of data packets over physical media such as coax cable, Cat5 cable, twisted pair, optical fiber, microwave and the like. As such, there may be simply a camera present at the retail outlet or training facility 160, leaving all or the majority of the data processing to occur in the cloud.

The general process for producing a customized item of wearable equipment for a body part can be described with reference to FIG. 15 as including a step of attaching one or more attachments to a base mold in order to produce a customized mold (step 1510/step 730). The general process also includes a step of producing at least part of the customized item of wearable equipment from production material shaped using the customized mold (step 1520/step 735). It is noted that the attachment(s) are characterized by at least one feature determined based on computer processing of data representative of the body part.

Figure 16A:
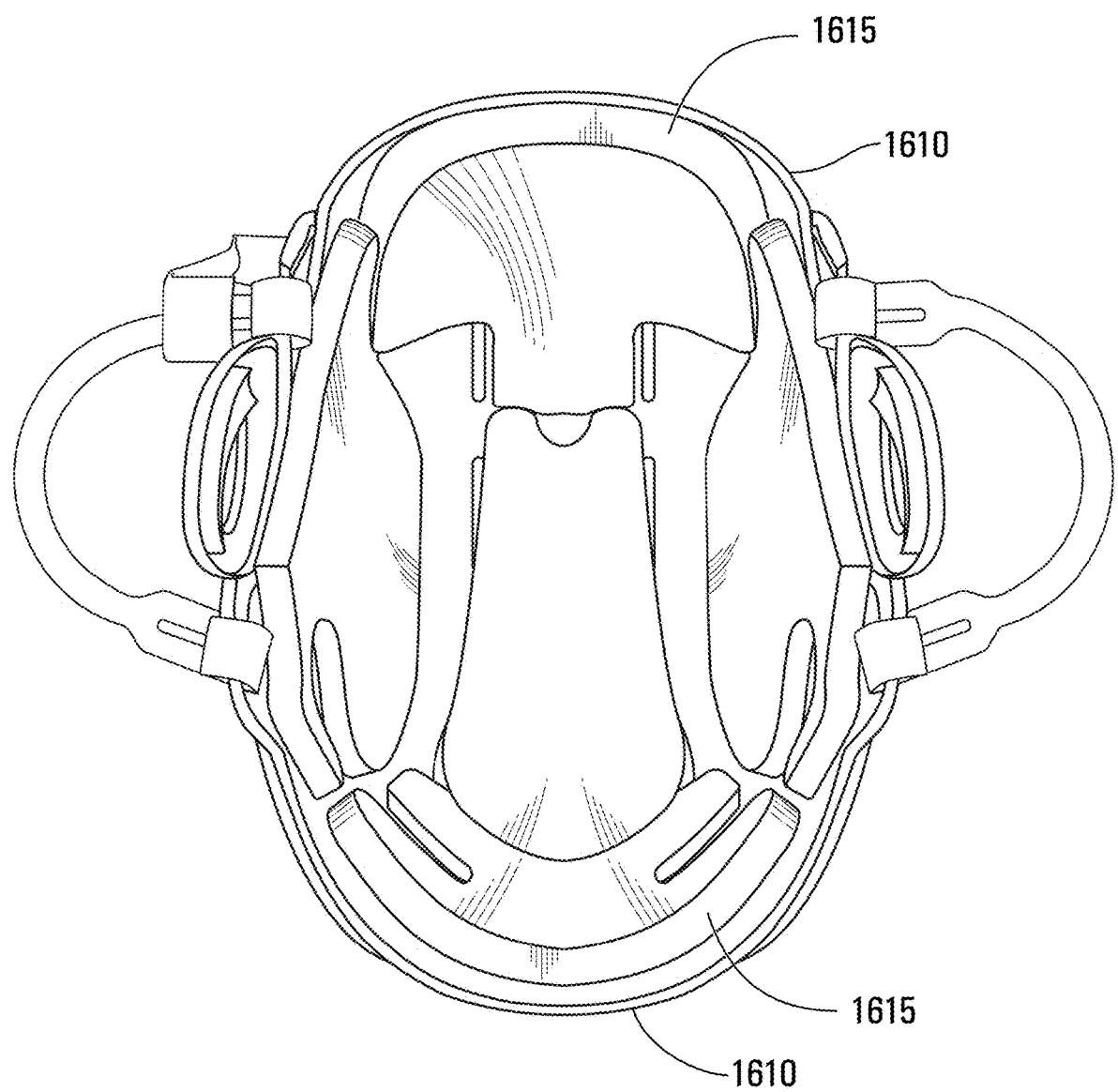
FIGS. 16A to 16E show variants of wearable equipment according to various example non-limiting embodiments.
Figure 16B:
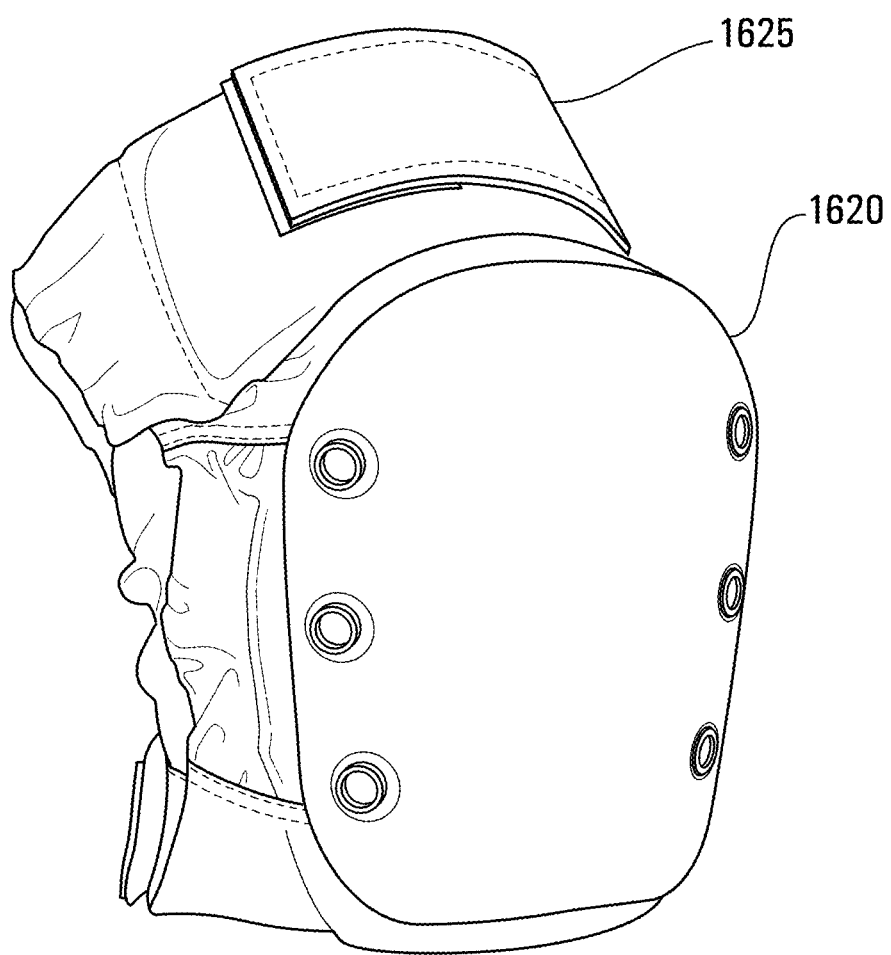
Figure 16C:
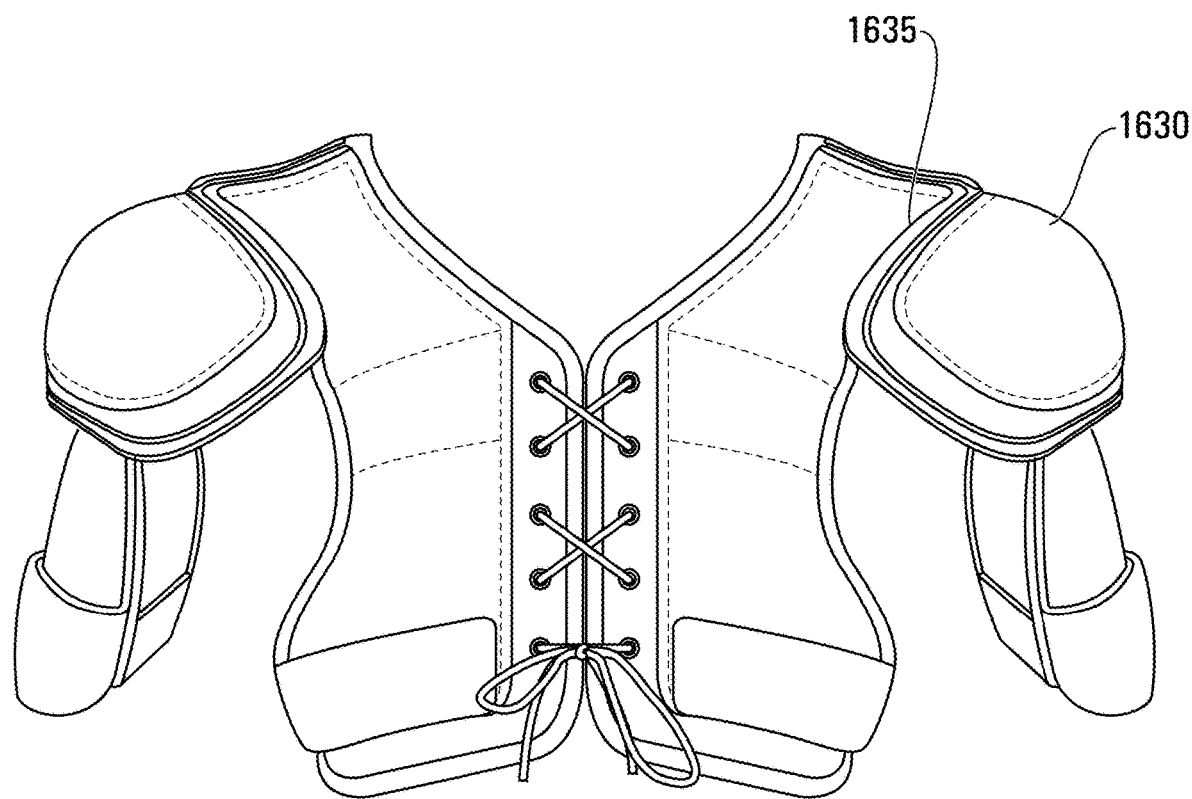
Figure 16D:
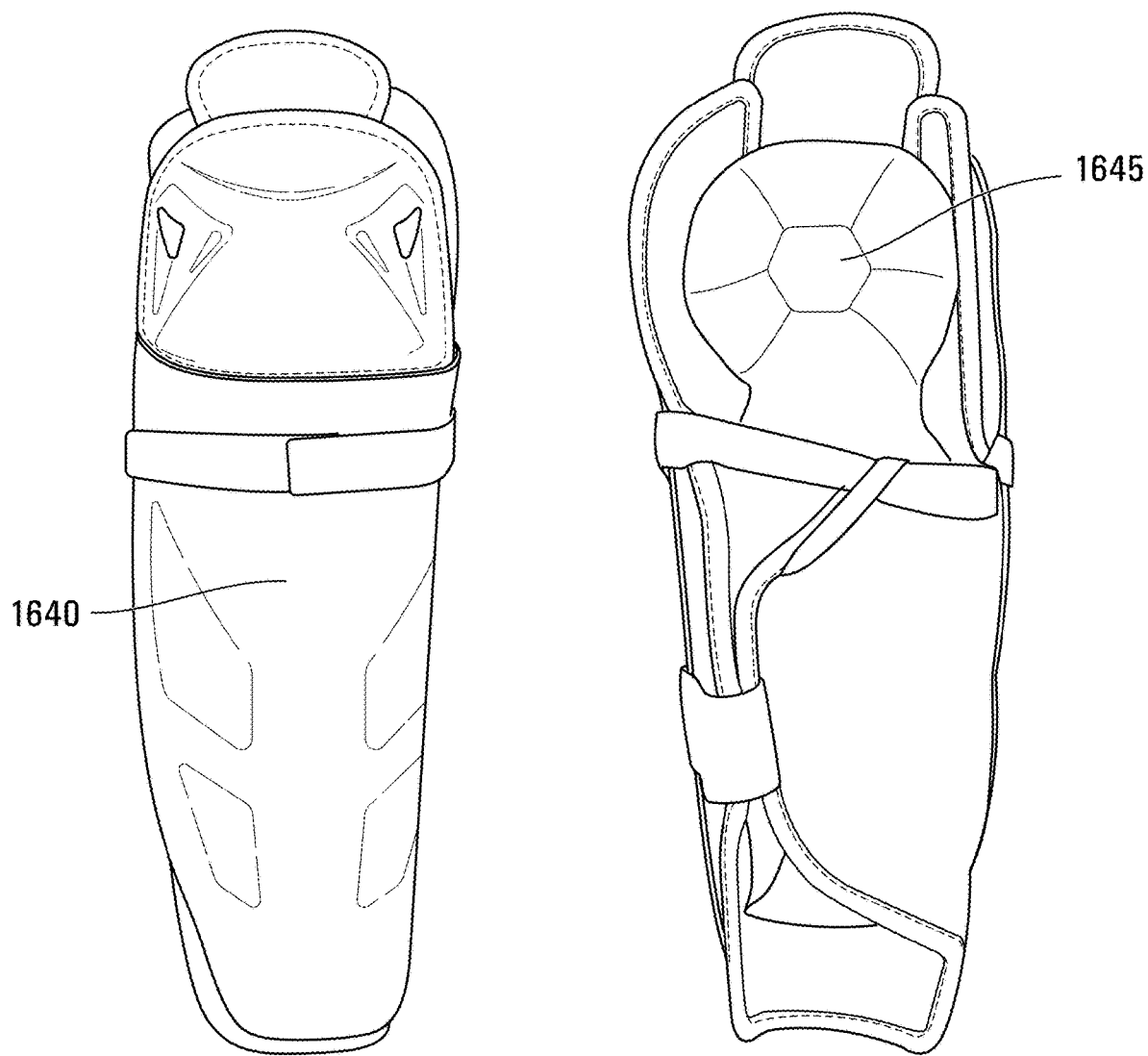
Figure 16E:
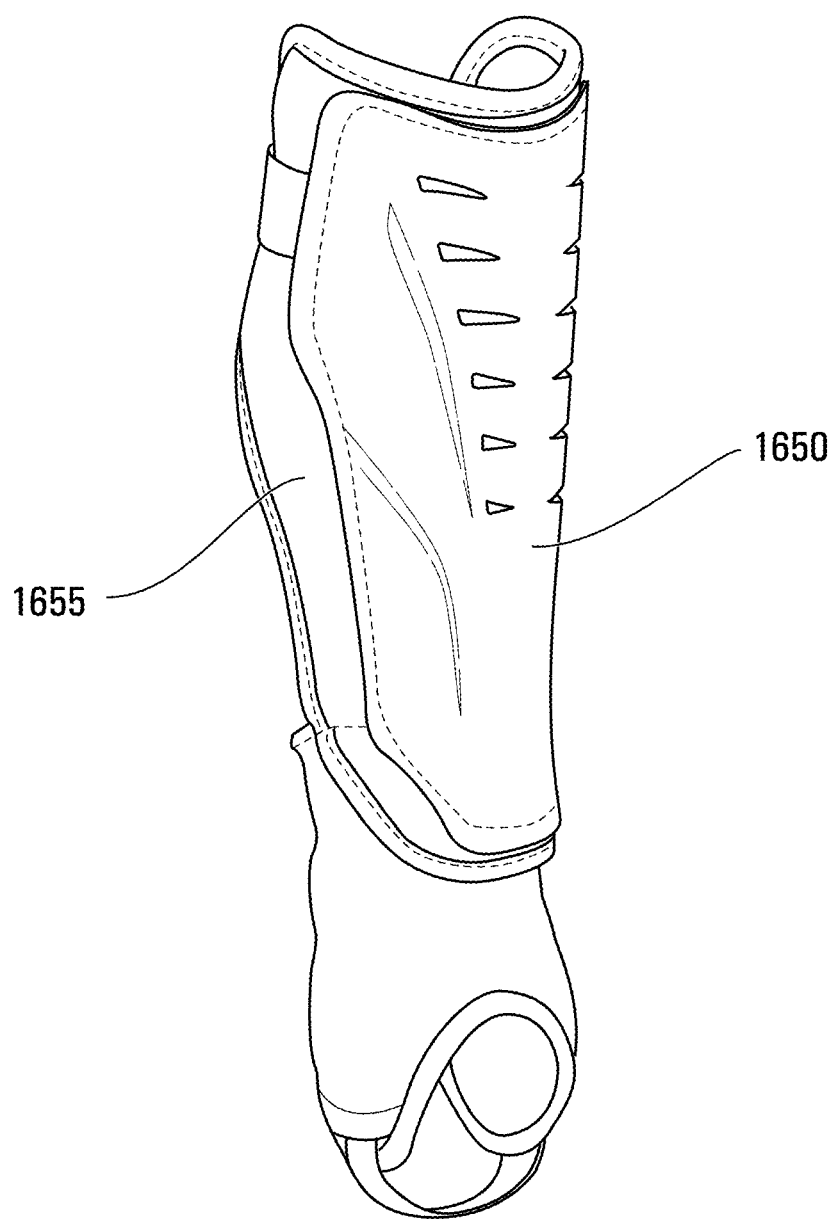

It should be understood that various elements of the process generally described above (and to be described in further detail below) may be applicable to the use of customized molds in the production of liners for a variety of wearable equipment used in a variety of activities. These include, without limitation, helmets (see FIG. 16A, shell at 1610, liner at 1615) such as for hockey, football, cycling, etc., elbow/knee protectors (see FIG. 16B, shell at 1620, liner at 1625), shoulder pads (see FIG. 16C, shell at 1630, liner at 1635), leg pads (see FIG. 16D, shell at 1640, liner at 1645) such as for hockey, lacrosse and baseball, and shin pads (see FIG. 16E, shell at 1650, liner at 1655) such as for soccer.

Figure 13:
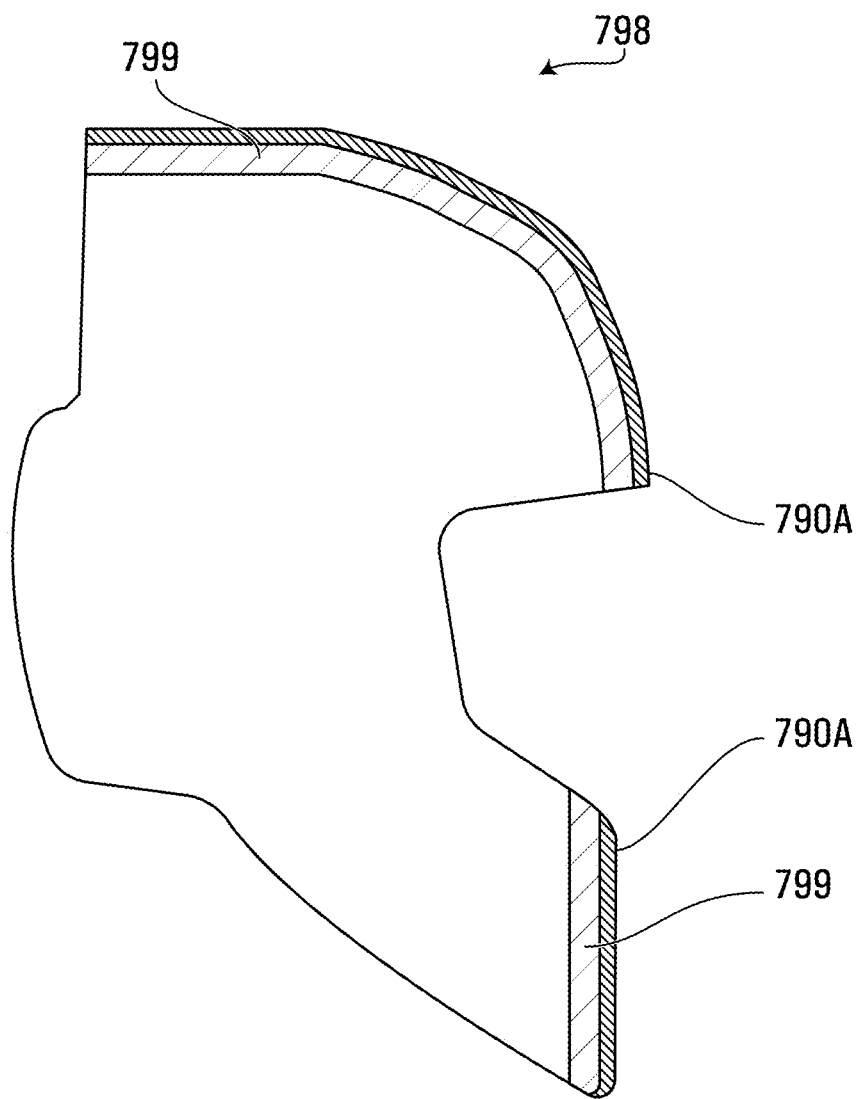
FIG. 13 is a rear view of a customized hockey goaltender mask according to an example non-limiting embodiment.

Without limiting the general applicability of the process to various types of wearable equipment, the following portion of this part of the disclosure will focus on various steps in the production of a hockey goaltender mask (see, e.g., FIG. 13 at 798) using a "generic goalie mask shell" (see, e.g., FIG. 13 at 790A) and a customized player-facing "external layer" which is in this case a customized liner (see, e.g., FIG. 13 at 799). The customized liner can be produced by a molding process that involves using a customized mold. The customized mold is made up of a base mold and at least one "mold attachment" characterized by at least one mold attachment feature determined based on computer processing of 3D model data representative of the wearer's face.

Figure 7C:
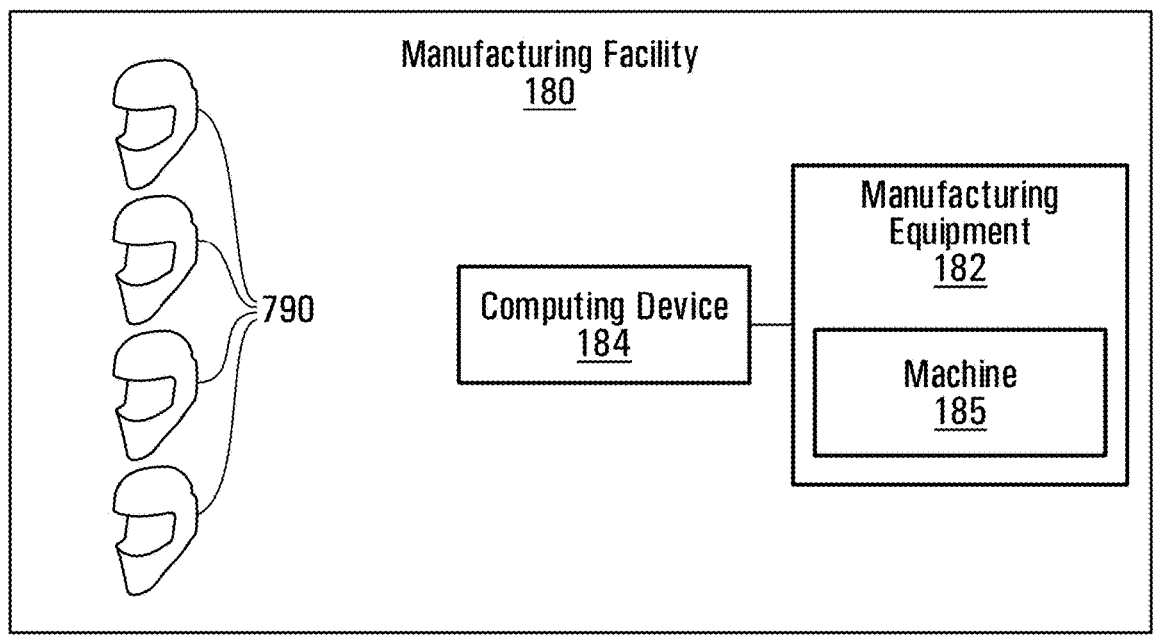
FIG. 7C is a block diagram showing components of a manufacturing facility, according to an embodiment.
Figure 7D:
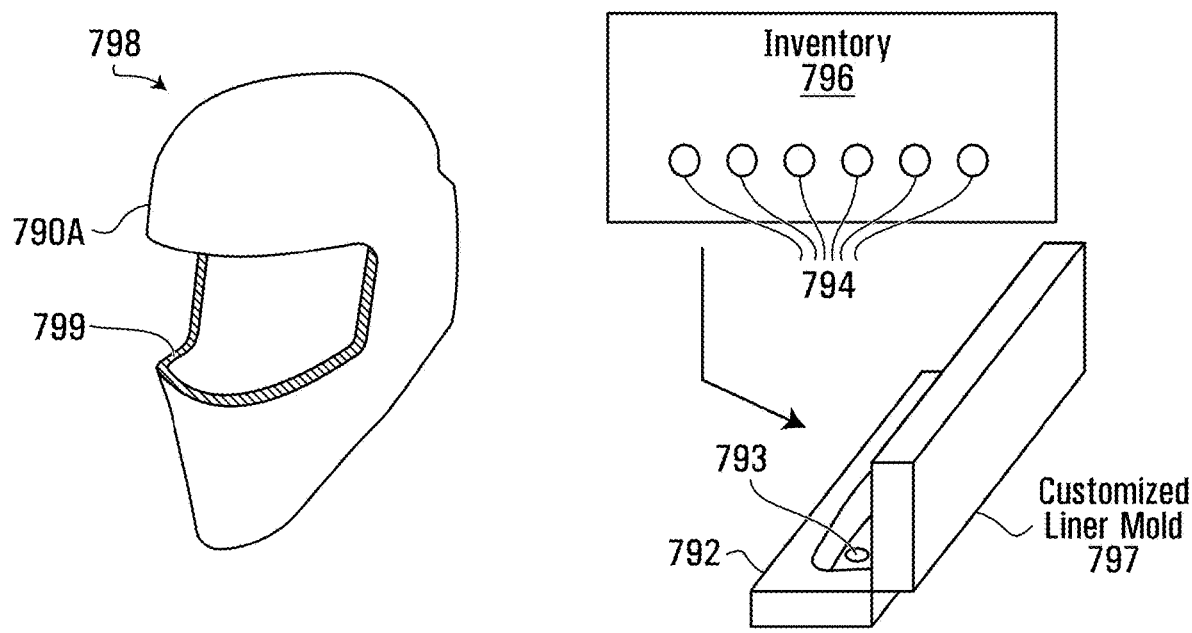
FIG. 7D is a perspective view of a generic goalie mask shell used by the manufacturing facility of FIG. 7C, according to an example non-limiting embodiment.

Accordingly, FIGS. 7C and 7D show the manufacturing facility 180 that includes a set of "generic goalie mask shells" 790, each of which can be made out of a variety of materials depending on operational requirements. The generic goalie mask shells 790 may include replicas of one another, or there can be several versions (e.g., for different sizes (S, M, L, XL) or for different genders (M,F)). Generic goalie mask shells form the basis from which individually customized goalie masks are made.

Figure 17:
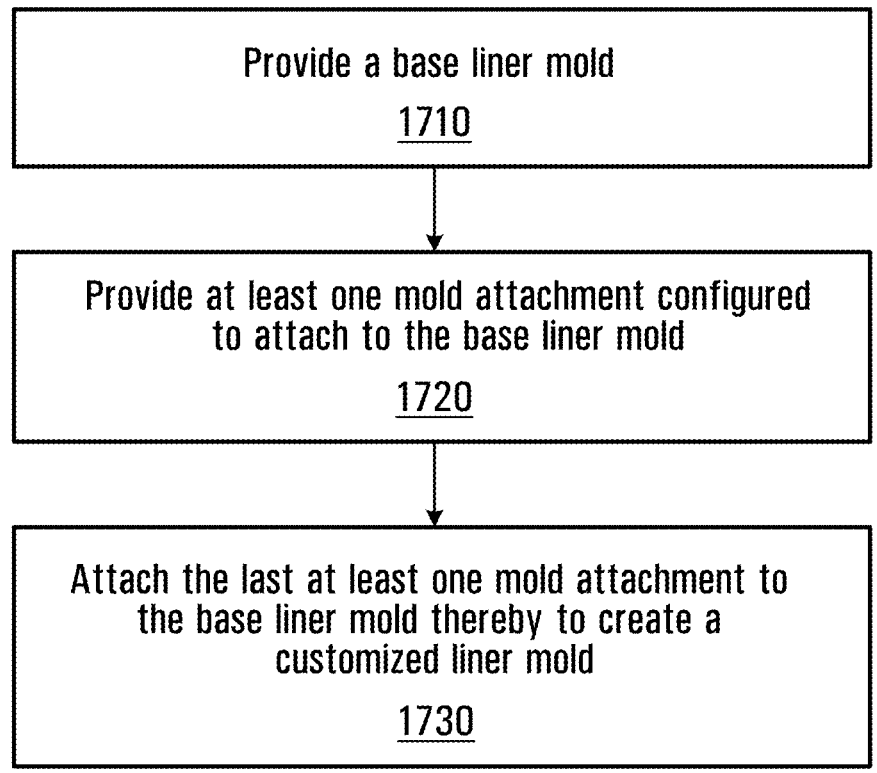
FIG. 17 is a flowchart showing steps in a process for creating a customized liner mold, in accordance with an example non-limiting embodiment.
Figure 19:
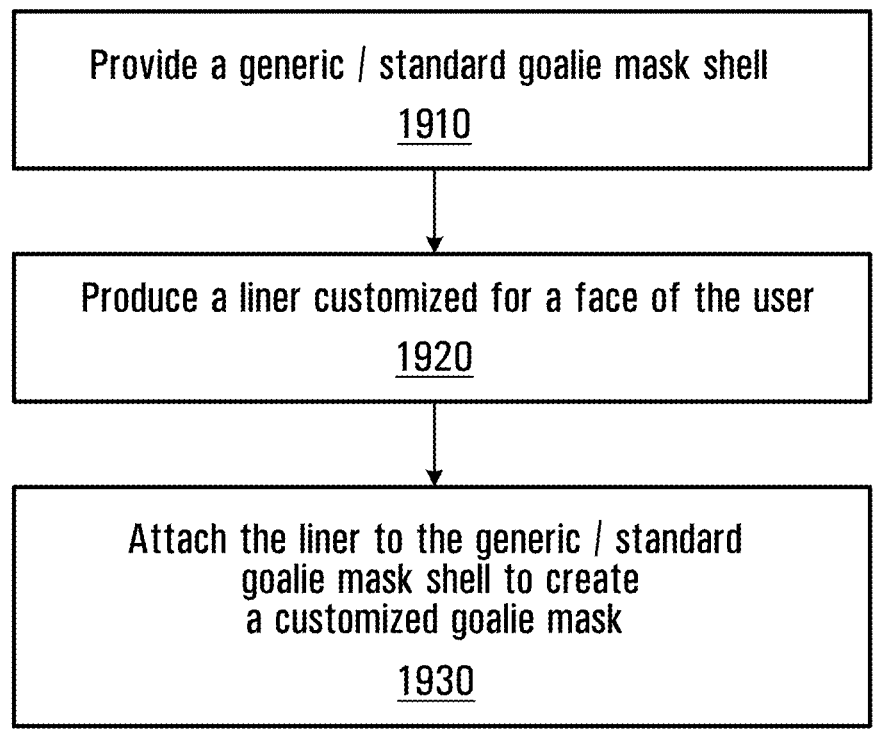
FIG. 19 is a flowchart showing steps for creating a customized goalie mask.

Specifically, and with reference to FIG. 19, a selected one of the generic goalie mask shells 790A is provided (step 1910), a liner 799 customized for a face of a user is produced (step 1920); and the liner is attached to the generic goalie mask shell (step 1930) to create a customized goalie mask 798. The customized liner 799 used with the selected generic goalie mask shell 790A to produce the customized goalie mask 798 can be created by a process under control of the computing device 184, and now described with reference to FIG. 17. Specifically, the process involves providing a base liner mold 792 (step 1710), providing at least one mold attachment 793 configured to attach to the base liner mold 792 (step 1720) and attaching the at least one mold attachment 793 to the base liner mold 792 (step 1730), thereby to create a customized liner mold 797, which is then used to create the customized liner 799. The dimensionality of the at least one mold attachment 793 is a function of the wearer's face and other parameters. The at least one mold attachment 793 can be manufactured on site or selected from a predetermined inventory 796 of mold attachments 794.

The following now provides more detail regarding execution of steps 700 through 745 in the case where a customized goalie mask is produced by attaching a customized liner to a generic goalie mask shell, the customized liner having been obtained from a customized mold constructed from a base mold customized with one or more attachments.

Step 700: Scan Wearer's Face to Obtain 3D Model Data Representative Thereof

This step may be carried out at a retail outlet such as a store or at the wearer's home or training facility.

Figure 8A:
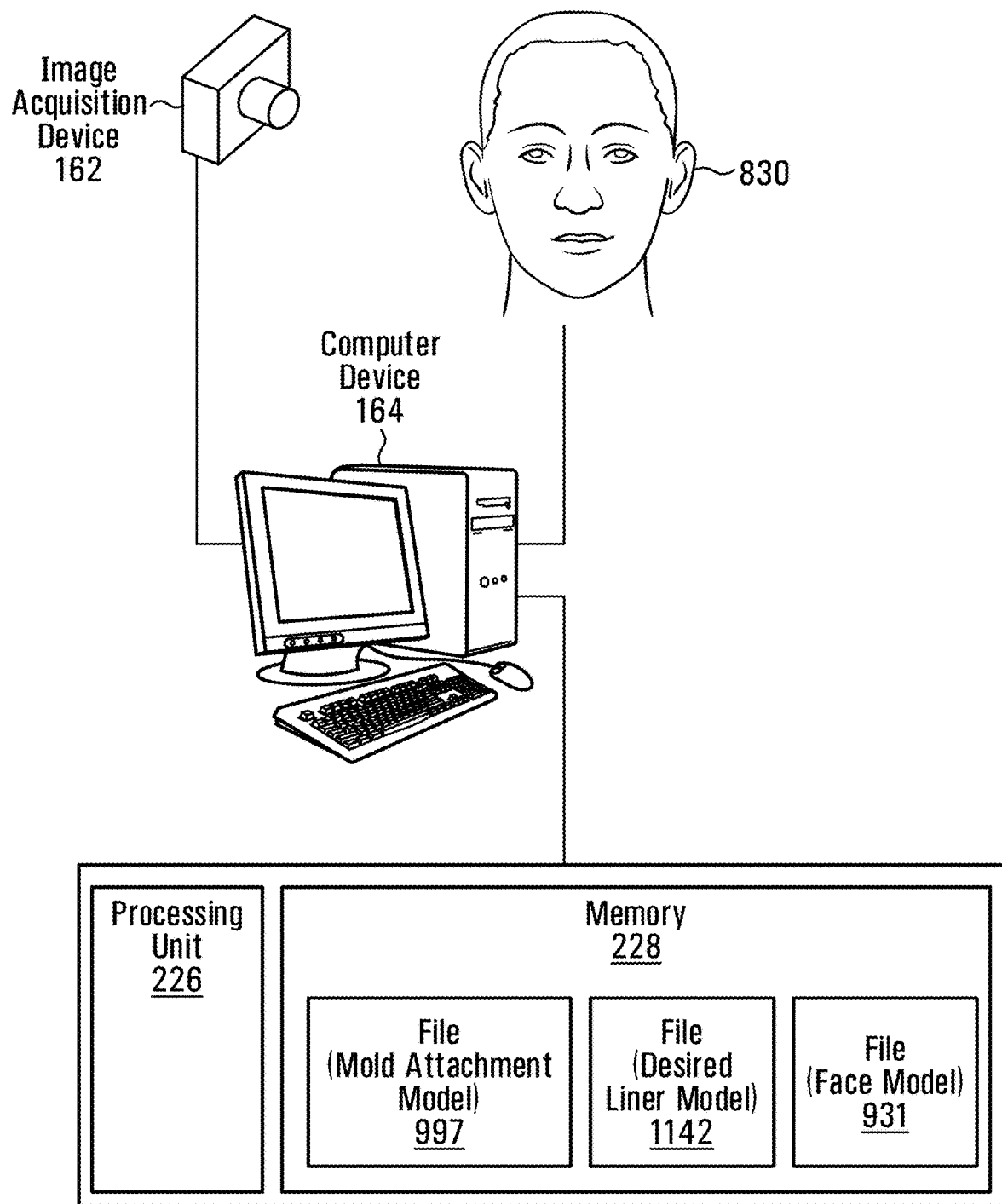
FIG. 8A is a block diagram showing components of a system to capture an image of a wearers face, according to an example non-limiting embodiment.

With reference to FIG. 8A, the previously described image acquisition device 162 may be configured to capture images of a wearer's face 830. The image acquisition device 162 is operatively connected to or integral with the previously described computing device 164. It is recalled that in some embodiments, the image acquisition device 162 may be implemented as a camera and the computing device 164 may be implemented as a tablet, smartphone, phablet or laptop. In other embodiments, the image acquisition device 162 may be embodied as a specialized external scanning hardware attachment (e.g., scanning gun).

While it is envisaged that the user of the computing device 164 may be a retail or sales specialist and that the wearer may be someone other than the user of the computing device 164, it is possible for the user of the computing device 164 to be the actual wearer, such as in a case where the computing device 164 is part of a self-scanning station at a store, for example.

The computing device 164 was previously described as comprising the processing unit 226 and the memory 228. The memory 228 may store instructions executed by the processing unit 226 in order to carry out a plurality of processes including operating system processes and applications.

In one embodiment, the image acquisition device 162 acquires images (such as 2D images) of the face 830 which are processed by a photogrammetry application running on the computing device 164 in order to create 3D model data representative of the face 830. In one embodiment, the "3D model data representative of the face 830" refers to data (such as points or voxels in a 3D coordinate system) that defines a "model" of the face 830, a model being a construct in virtual 3D space. For example, the 3D model data representative of the face 830 can be stored in the memory 228. This 3D model data may include parameters stored as part of a computer-readable file 931 (stored in the memory 228) having a certain standardized format to allow downstream viewing and manipulation of the model by a 3D modeling application. This, in turn, allows the faithful reproduction of the shape of the face 830 in a graphical or physical medium.

In a non-limiting example, the format of the file 831 can be a .3DM file format (Rhinoceros file format), although other file formats are possible, such as .AI, .DWG, .PRT and .DXF, to name a few non-limiting possibilities. When the file 831 that stores the 3D model data representative of the face 830 is stored in a .3DM file format, for example, this allows a 3D modeling application to produce on-screen images that faithfully reproduce the appearance of the shape of the face 830.

Figure 8B:
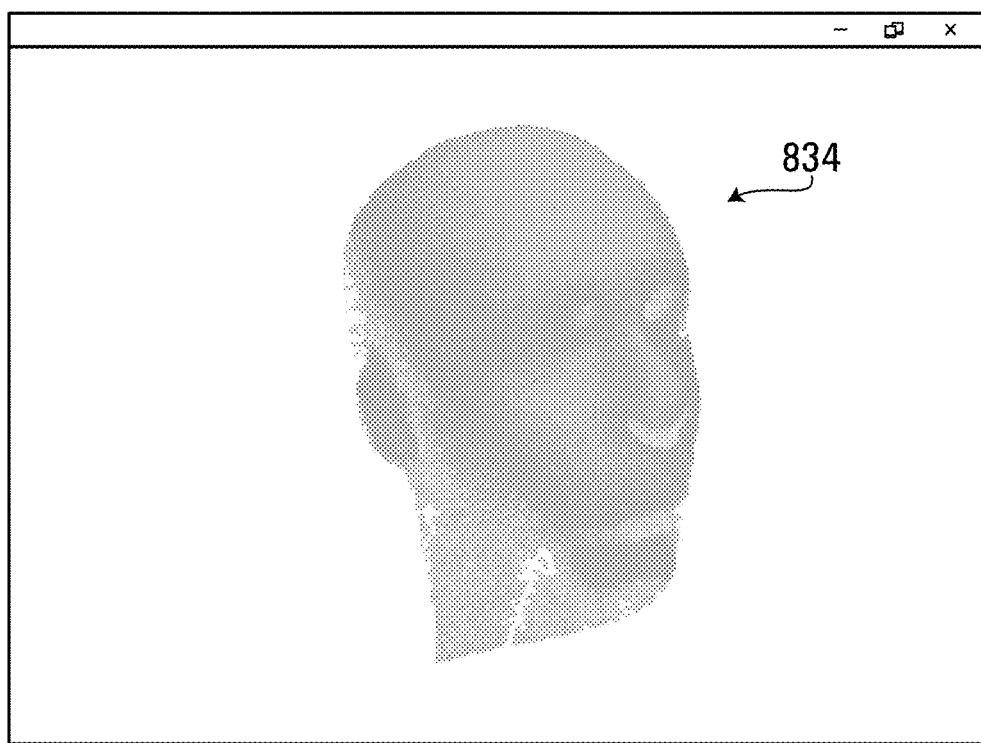
FIG. 8B is an image of the shape of a face generated by a 3D modeling application.

FIG. 8B shows a face image 834 rendered in two dimensions (e.g., for display on a screen from a selected angle/perspective). The face image 834 evokes the shape of the face 830. The face image 834 may be generated by the SpecifX™ 3D modeling application as it interprets the file 831 containing 3D model data representative of the face 830. The 3D modeling application may be instructed by a user to change perspectives and manipulate (change the dimensionality of) the face image 834. This can be done through interaction with a mouse or touch-screen, for example.

Step 705: Detecting Biometric Landmarks in the Model of the Wearer's Face

Figure 9A:
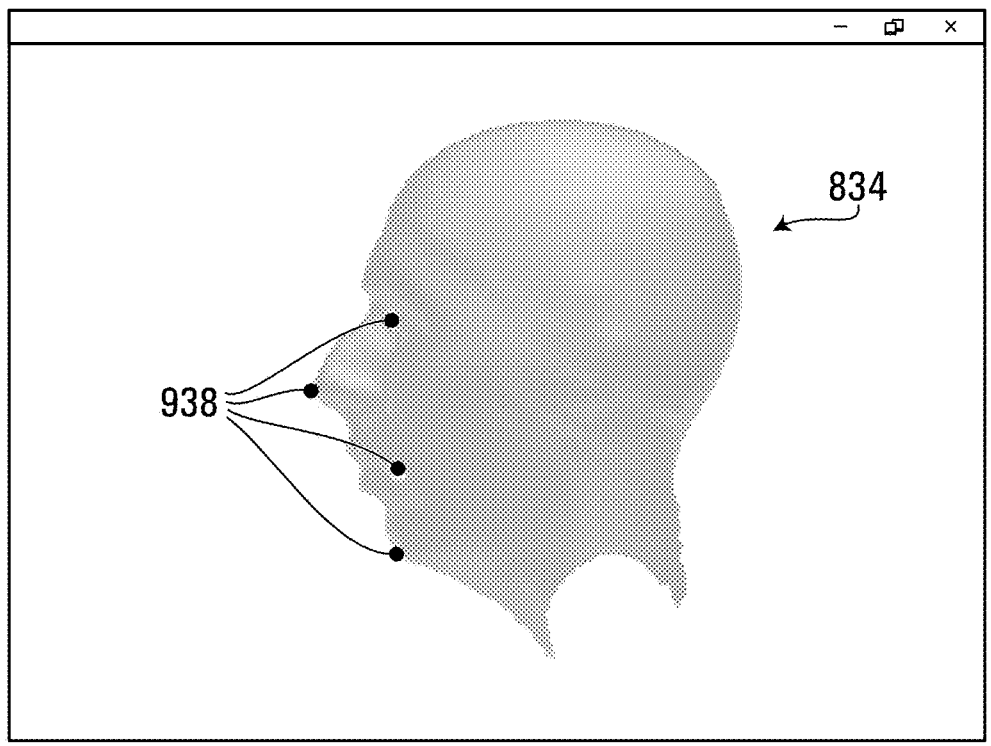
FIGS. 9A and 9B are side and front views of a face image comprising identified biometric landmarks, according to various example non-limiting embodiments.
Figure 9B:
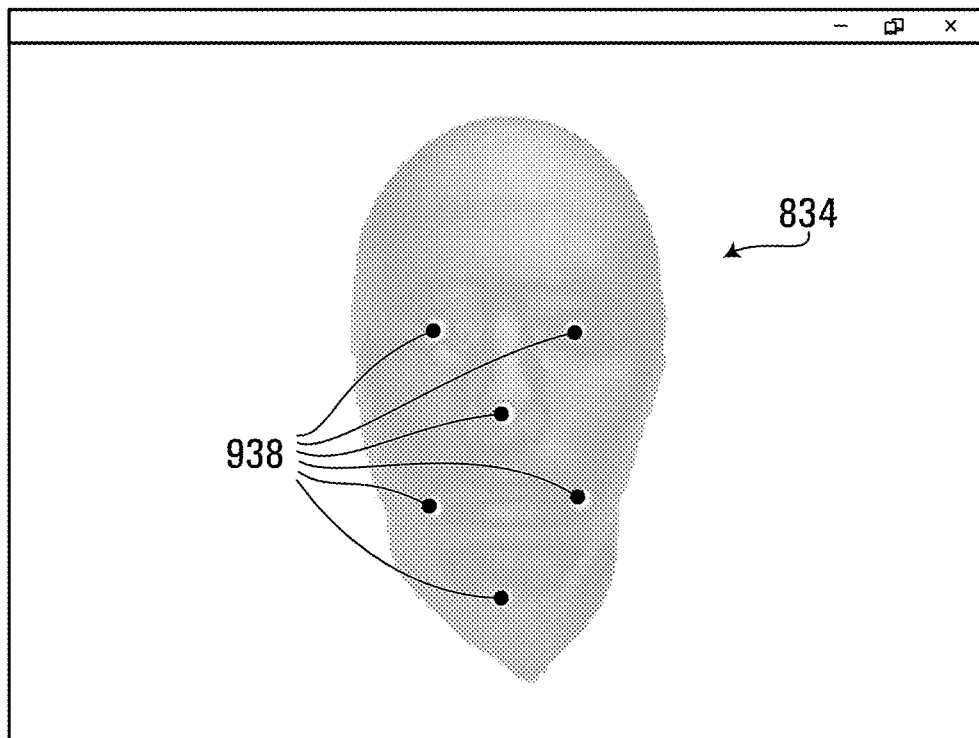

This step includes detecting biometric landmarks in the 3D model data representative of the wearer's face 830; these biometric landmarks may be rendered in the face image 834 as they are detected. With reference to FIGS. 9A and 9B, biometric landmarks 938 may include eyes, nose and chin. Other landmarks may be used, such as cheekbones and ears. In one embodiment, identification of the biometric landmarks 938 can be done manually by the user, whereas in another embodiment it may be automated using artificial intelligence.

Figure 9C:
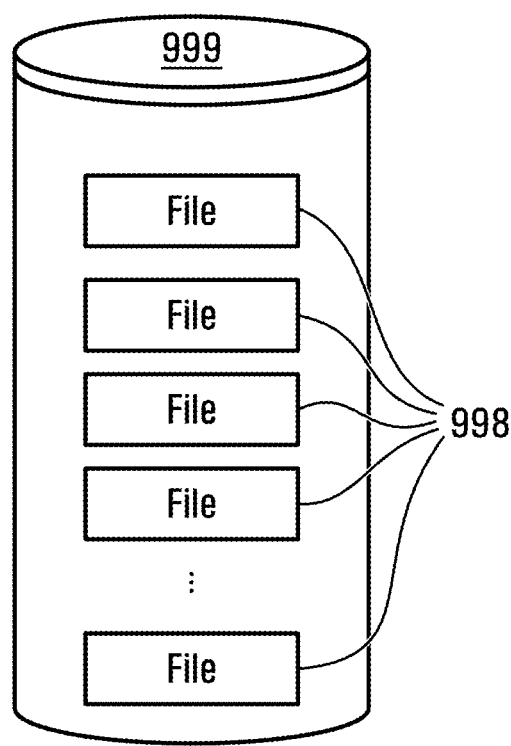
FIG. 9C is a block diagram showing a database for storing files containing 3D model data.

Step 710: Place a Generic Goalie Mask Shell Model Relative to the Model of the Wearer's Face in Virtual 3D Space This step includes orienting a "generic goalie mask shell model" relative to the model of the face 830. Recall that the model of the face 830 is a construct in virtual 3D space defined by the 3D model data representative of the face 830. Analogously, a generic goalie mask shell model is a construct in virtual 3D space defined by 3D model data representative of one of the generic goalie mask shells 790. With reference to FIG. 9C, the 3D model data for various generic goalie mask shells 790 may include parameters stored as computer-readable files 998 in a database 999. The database 999 may be part of the computing device 184 and/or it may be accessible over the data network 163. The files 998 have a certain standardized format to allow downstream viewing and manipulation of the corresponding model by a 3D modeling application. In some cases, there may be a plurality of available generic goalie mask shell models (representing corresponding generic goalie mask shells 790), and one generic goalie mask shell model (representing corresponding the selected generic goalie mask shell 790A) may be selected from the plurality of available generic goalie mask shell models using a variety of criteria (including, possibly, the landmarks 938 in the image 834).

In some embodiments, the generic goalie mask shell model includes a model of a shell together with a model of a cage. The cage has a plurality of intersecting bars forming apertures that are typically configured to be small enough to prevent a puck from penetrating through to contact the wearer's face. The bars may include generally horizontal and generally vertical bars, or bars having arbitrary shapes, including curved shapes.

Figure 10A:
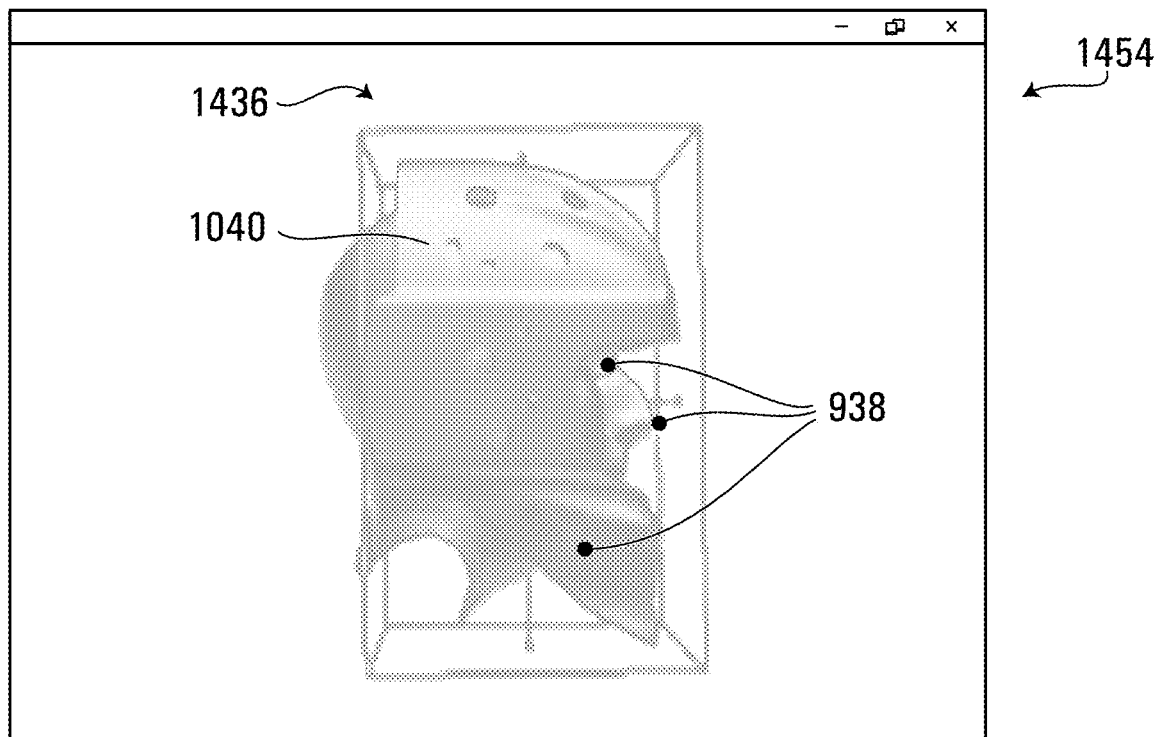
FIGS. 10A and 10B are side and front views of a generic goalie mask shell and a face relatively placed to each other, according to various example non-limiting embodiments.
Figure 10B:
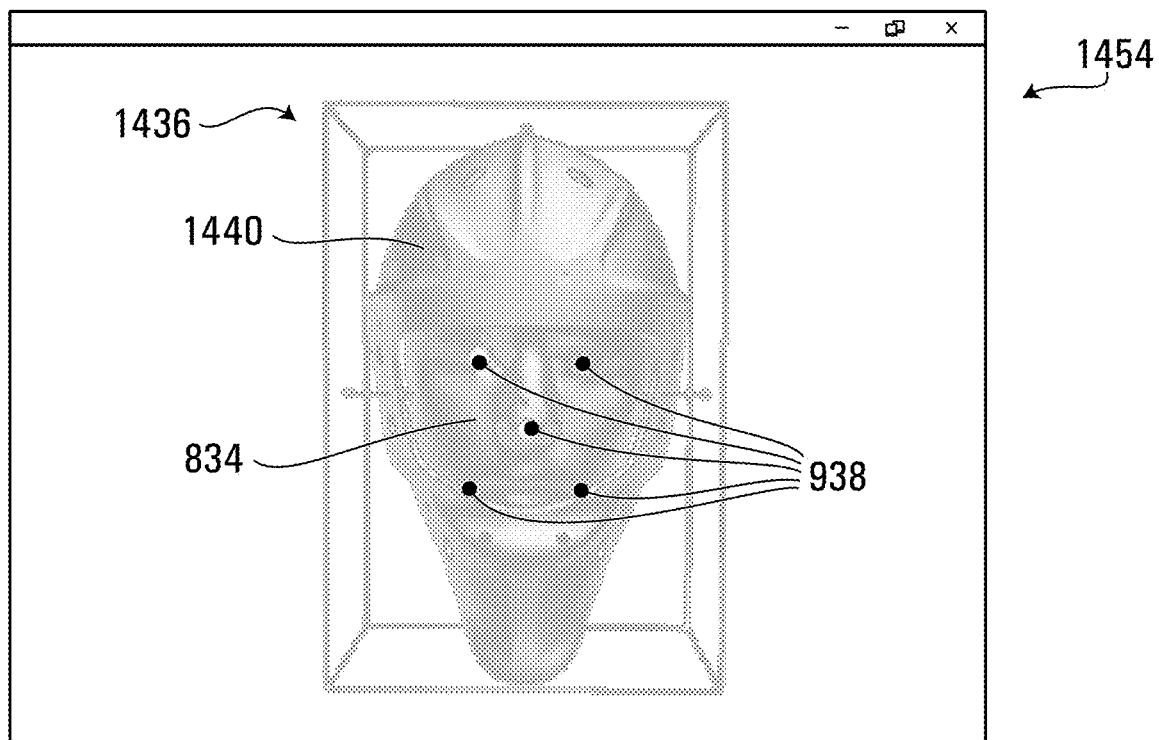

In one non-limiting embodiment, placement of the selected generic goalie mask shell model relative to the model of the face 830 (i.e., in 3D space) may be based on the position of the landmarks 938 in the model of the face 830. This is shown in FIGS. 10A and 10B, where a generic goalie mask shell image 1040 (which is a 2D rendering of the model of the selected generic goalie mask shell 790A) is placed relative to the face image 834 (which is a 2D rendering of the model of the face 830), so as to achieve certain distance metrics. Placement may be done manually (by the user) based on user preferences and/or observations of the landmarks 938, or automatically so as to choose optimal placement.

Criteria for placement of the model of the selected generic goalie mask shell 790A relative to the model of the face 830 may vary. For example, they may include depth (distance) from the cage to the nose (e.g., such that a distance between the nose and the cage is within a predetermined range of distances, such as 5 mm+/−1 mm, or 10 mm+/−2 mm or 20 mm+/−2 mm, to name a few non-limiting possibilities), vertical distance from the edge of the shell to the eyebrows (e.g., with similar ranges), etc. These distances may be measured by the 3D modeling application based on the data in the file 998 containing the 3D model data representative of the selected generic goalie mask shell 790A and the file 831 containing the 3D model data representative of the face 830. It is also envisaged that placement could be done automatically, whereby a computer program called by the 3D modeling application may place the model of the selected generic goalie mask shell 790A in a "suggested optimal" way for a player.

For example, the model of the selected generic goalie mask shell 790A may itself comprise landmarks corresponding to the landmarks 938 in the model of the face 830, and placement of the model of the selected generic goalie mask shell 790A relative to the model of the face 830 may be accomplished according to pre-determined criteria, for instance, such as to obtain a minimal average distance between each pair of corresponding landmarks in the two models. When a plurality of models of generic goalie mask shells is available, one such model of a generic goalie mask shell may be selected by placing each of the available models of generic goalie mask shells relative to the model of the face, determining an indicia of fit—such as, for instance, the above-discussed minimal average distance between each pair of corresponding landmarks—and selecting the model of the generic goalie mask shell having the best indicia of fit. This process may be conducted automatically or with the assistance of the user.

Figure 20A:
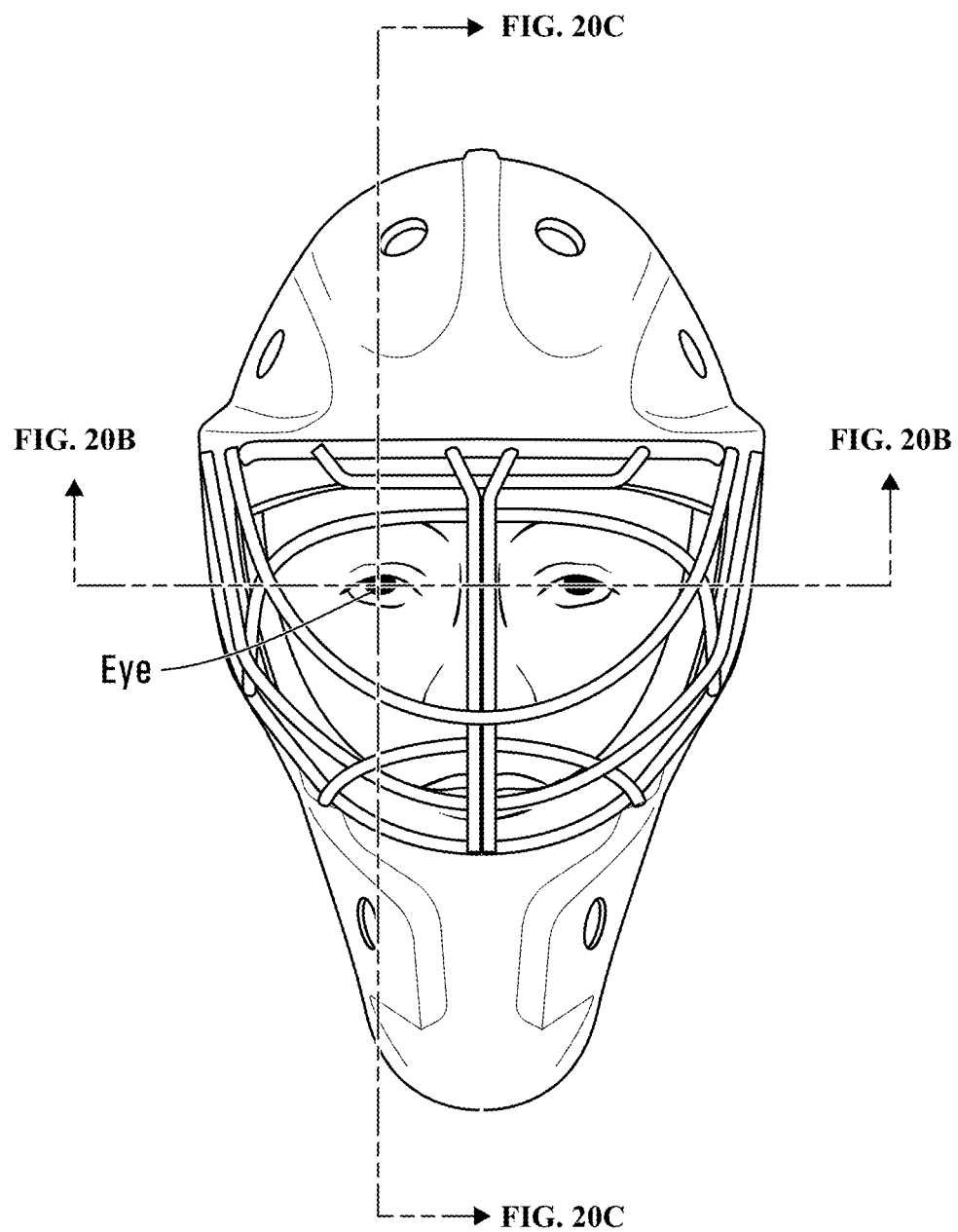
FIG. 20A is a front view of a goalie mask shell comprising a cage having horizontal and vertical bars, according to an example non-limiting embodiment.
Figure 20B:
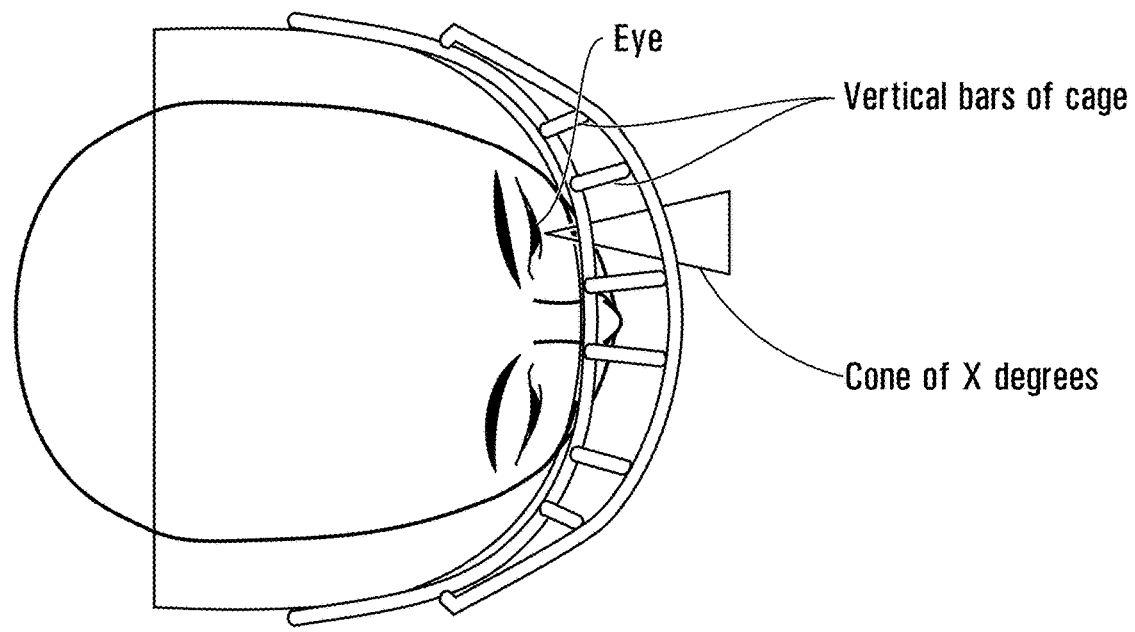
FIGS. 20B and 20C show variants of a cage aperture in relation to the horizontal and vertical bars, according to various example non-limiting embodiments.
Figure 20C:
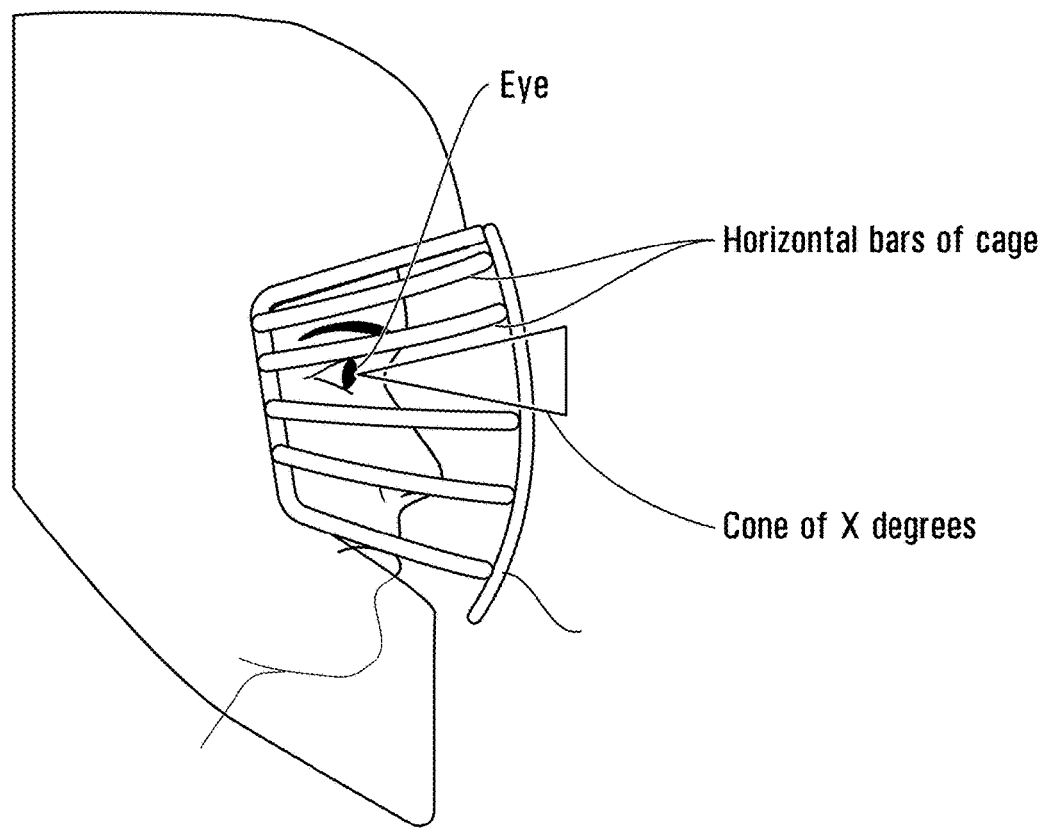

Another criterion for placement of the model of the selected generic goalie mask shell 790A relative to the model of the face 830 could be the position of the apertures of the cage relative to the eyes of the face. For example, as shown in the non-limiting example of FIGS. 20A-20C, the cage is attached to the shell and has horizontal and vertical bars forming apertures in between. The bars may obstruct vision to a greater or lesser extent, depending on the placement of the cage. The model of the selected generic goalie mask shell 790A could thus be positioned relative to the model of the face 830 cage in such a way that the eyes of the face have a view that is in line with two of the apertures created by the crossing of the bars. Alternatively, consider a cone emanating from each eye of at least X degrees, where X could be 5, 10, 30, 45 or a different number of degrees, either greater, smaller or in between. Depending on the value of X (which could represent the minimum cone of vision required for vision to be considered unobstructed, and depending on the position of the selected generic goalie mask shell 790A relative to the model of the face 830 (which is controllable during step 710), the cone may intersect one or more of the or bars or clear the bars entirely. As such, the cage may be positioned such that the eyes of the face have a view that is unobstructed by the bars of the cage.

Step 715: Create a Model of a Desired Liner Placed Between the Model of the Generic Goalie Mask Shell and the Model of the Wearer's Face It is recalled that the liner 799, which includes compressible material, is to be added to an interior-facing surface of the selected generic goalie mask shell 790A before the resulting customized goalie mask 798 is donned by the wearer. The liner 799 is obtained through a design process involving the 3D modeling application 300.

Figure 11:
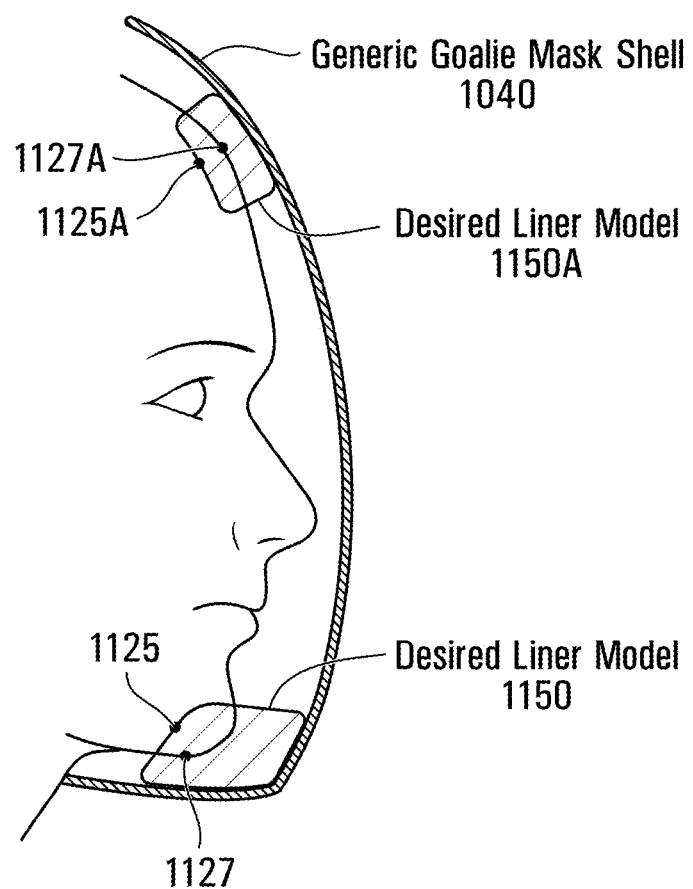
FIG. 11 is a side view of a generic goalie mask showing a desired liner model, according to an example non-limiting embodiment.

Specifically, and with reference to FIG. 11, the generic goalie mask shell image 1040 (which is a 2D representation of the model of the selected generic goalie mask shell 790A) can be enhanced with add-ons that represent the desired extent of lining material to be affixed to the selected generic goalie mask shell 790A. The construct in the virtual 3D space created by the volumetric additions to the model of the selected generic goalie mask shell 790A may be referred to as a "desired liner model" 1150, and may be represented by its own corresponding 3D model data, which may be stored as a file 1142 in the memory 228/328. Another example of a desired liner model is given by 1150A.

Figure 20D:
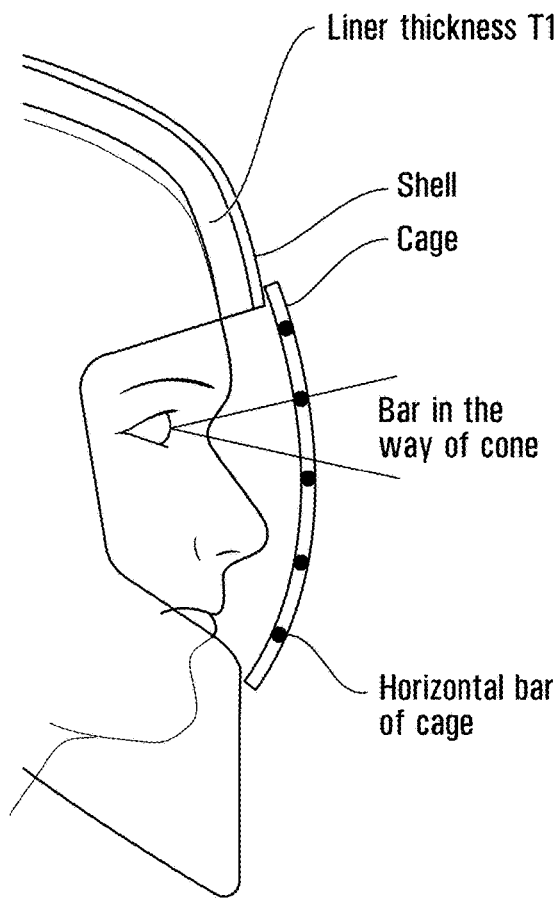
FIGS. 20D and 20E show variants of liner thickness for obtaining a desired liner model according to various example non-limiting embodiments.
Figure 20E:
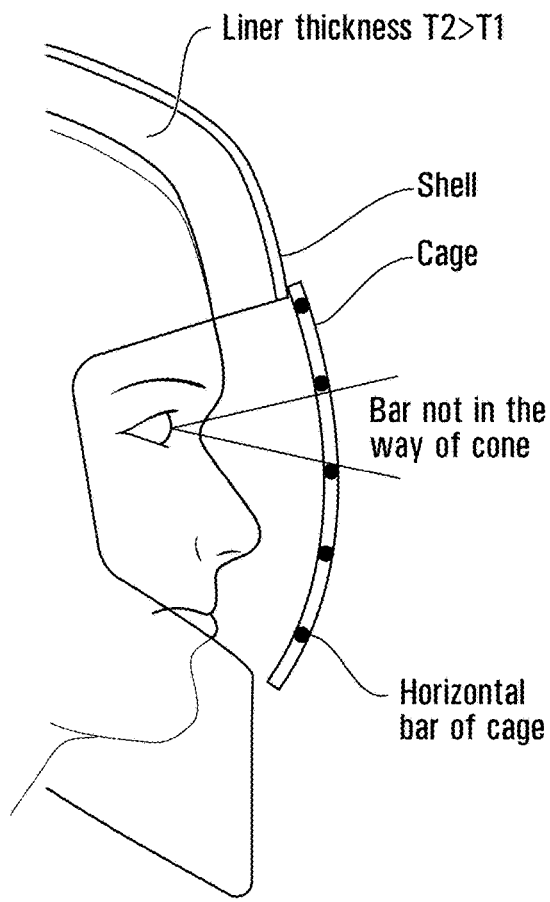

In this way, a desired liner model is created that at least partly fills a space between the model of the shell and the model of the face. This may be done in order to meet certain design objectives, such as vision being unobstructed by the cage. For example, FIGS. 20D and 20E show two different outcomes, wherein in FIG. 20E, a design objective was to have the cone of vision unobstructed by the horizontal bars of the cage, and wherein in FIG. 20D, no such design objective was provided. In the case of FIG. 20E, the thickness of the desired liner model is greater than the thickness of the desired liner model in FIG. 20D.

The 3D modeling application may make suggestions of liner models, and these can be selected and/or modified by the user to achieve the "desired liner model" 1150 that provides a suitable fit for the wearer. Those skilled in the art will understand that what constitutes a suitable fit may depend on operational requirements.

For example, in an embodiment, the 3D modeling application 300 can be configured to determine the distance between certain points in the model of the face 830 (e.g., cheeks, forehead and back of the head) and corresponding points on the internal-facing surface of the desired liner model 1150. The user then controls these distances by manually adjusting (increasing or decreasing) the thickness of the desired liner model; alternatively, the distance can be set and the desired liner model 1150 can be created as a result of this distance being respected. The distance between the desired liner model 1150 and model of the face 830 may be uniform or non-uniform across different regions of the face.

It should be appreciated that the desired liner model 1150, although customized, may need to respect certain thickness criteria in order to provide adequate impact protection. The 3D modeling application 300 may be configured to impose these thickness criteria (e.g.; minimum thickness of 1, 2, 5, etc. millimeters).

It should be appreciated that the use of a software tool for the purpose of specifying the desired liner model 1150 is advantageous for various reasons, including because it allows "interference". Specifically, a snug fit of the mask on the wearer's face requires compression of the liner, which means that the distance between internal-facing points 1125 on the desired liner model 1150 and corresponding points on the model 1127 of the face 830 should actually be negative. This represents areas where compression of the lining material will occur when the eventual physical product is worn. Another example of interference is given by points 1125A and 1127A.

Figure 18:
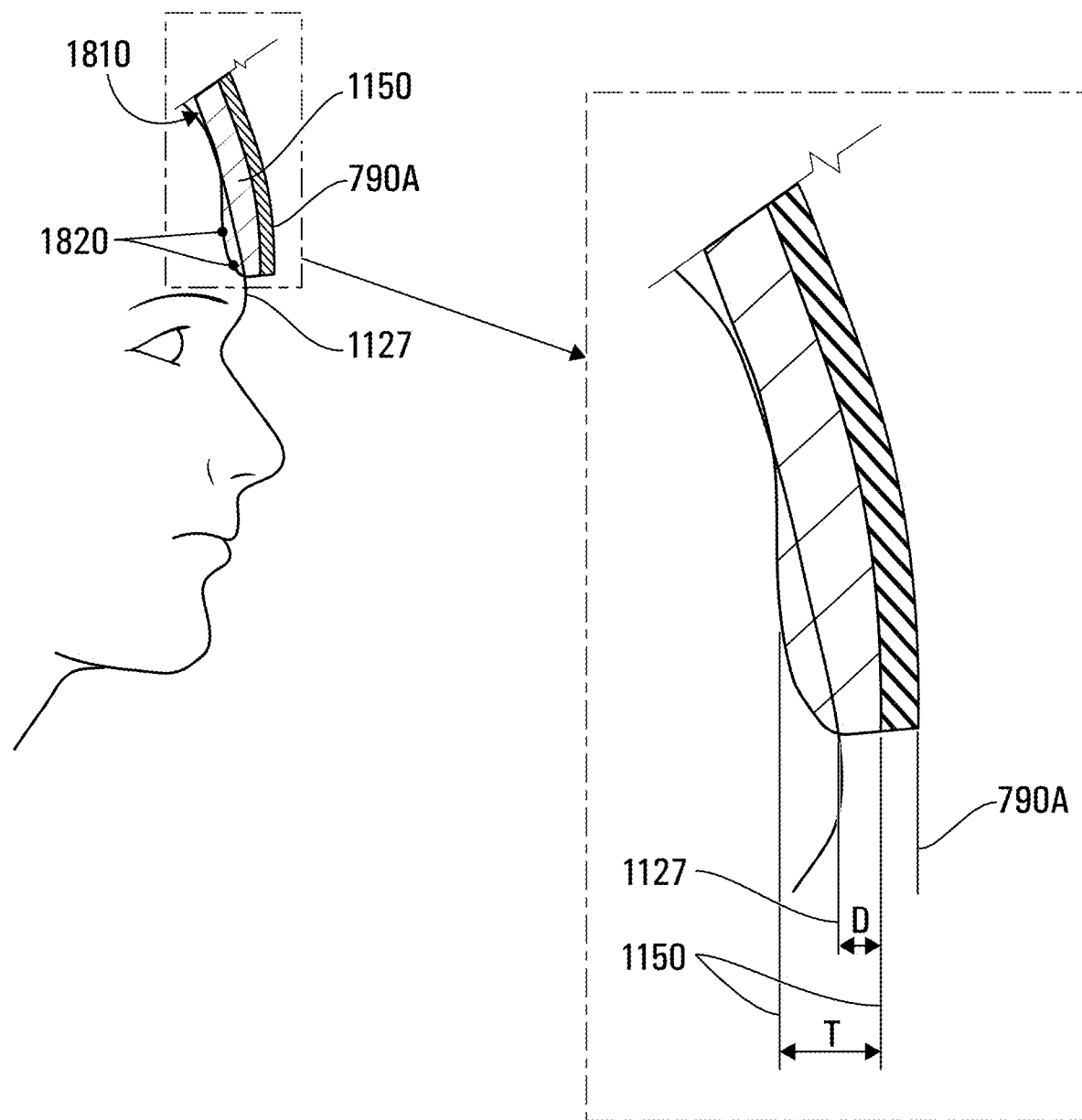
FIG. 18 is a diagram showing compression of the lining material according to an example non-limiting embodiment.

With reference to FIG. 18, another way to describe compression of the lining material is to consider that the desired liner model 1150 has a surface 1810 and a thickness T at each point along the surface 1810, and for at least some points 1820 along the surface 1810 of the desired liner model 1150, the thickness T of the desired liner model 1150 is greater than a distance D between the model of the selected generic goalie mask shell 790A and the model of the face 1127 at those points 1820.

An acceptable thickness of the liner in different areas of the face may also be a function of the compression ratios and the type of lining material that is ultimately used in production of the mask, as well as certification limitations. In some embodiments, the lining material can be a viscoelastic polymer foam, LDPE or EVA foam with a shore OO hardness that ranges from about 20 to about 60. The compression ratios of the compressible lining material can range from 5% to 75% (e.g., making the ratio of the thickness T to the distance D range between 1.95 and 1.75), although this range should not be considered limiting.

Specifically, the 3D modeling application may be configured to allow the user of the computing device 164/184 to choose different amounts of interference between desired liner model 1150 and the model of the face 830 at different locations. As an example, higher interference can be chosen in softer head areas (cheeks) and lower interference can be preferred in hard areas (bones and skull). The shape of the head and the desired interference will drive the dimensions of the desired liner model.

Step 720: Determine at Least One "Mold Attachment Feature", so that a Customized Mold Made from a "Base External Layer Mold" to which Attachments Having Such Features are Appended would Produce a Customized External Layer that is Represented in Virtual 3D Space by the Desired External Later Model.

A model of the base liner mold 792 is provided and mold attachment features are determined based on the desired liner model and the model of the base liner mold 792. The "mold attachment features" define a volumetric addition to be made to the model of the base liner mold 792 in order to approach the shape of the desired liner model 1150 (which consequently has a smaller interior volume than the base line mold 792). This may be done by a computer-assisted volumetric subtraction between the desired liner model 1150 and the space occupied by the model of the base liner mold 792. The base liner mold 792 may be a simple shape that, on the one hand, is configured to align with the inside-facing surface of the selected generic goalie mask 790A, and on the other, is configured to accommodate a wide range of potential variations in the shape of the desired liner model.

In a first non-limiting embodiment, the "mold attachment features" may include the specification/dimensions of one or more physical mold attachments to be produced. A computer-readable file 997 containing these dimensions may be created and stored in the memory 228/328 or other storage medium in association with an identification (e.g., name) of the wearer, for future reference.

In a second non-limiting embodiment, the "mold attachment features" may include an identification (e.g., code or serial number) of one or more of the pre-existing physical mold attachments 794 that may be stored in inventory 796.

Step 725: Obtain the at Least One Mold Attachment

A mold attachment having the at least one determined mold attachment feature is "obtained". This could mean that the mold attachment is manufactured on site or remotely. For example, the mold attachment can be made of ABS, Nylon, Polyurethane or Epoxy material, to name a few non-limiting possibilities This could also mean that the mold attachment is retrieved from 796 inventory if its dimensions match those of pre-configured mold attachments 794 in inventory 796.

Step 730: Attach the Mold Attachment to the Base Liner Mold, Thereby to Produce a Customized Liner Mold With reference to FIG. 12A, once the at least one mold attachment 793 for the base liner mold 792 has been obtained (i.e., manufactured or retrieved from inventory), the at least one mold attachment 793 can be attached to the base liner mold 792 to create the custom liner mold 797. This can be achieved in a variety of ways. For example, as shown in FIG. 12A, the at least one mold attachment 793 may be glued to the base liner mold 792 to create the customized liner mold 797. The base liner mold 792 may include markers where the at least one mold attachment 793 is to be glued.

Figure 12B:
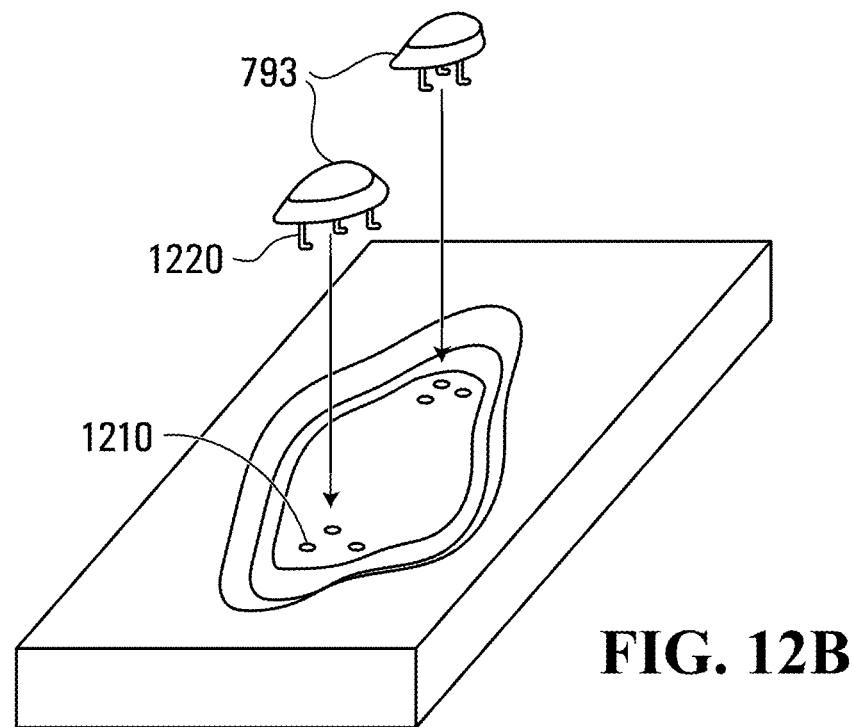

It should be appreciated that the at least one mold attachment 793 may have special areas with built-in projections 1220 as shown in FIG. 12B. Specifically, the at least one mold attachments 793 may be "plugged into" corresponding attachment points (e.g., recesses 1210) in the base liner mold 792 to create the customized liner mold 797. In a complementary embodiment, the at least one mold attachment 793 may be provided with recesses and it is the base liner mold 792 that has projections.

Clearly, other techniques may be used for securing the at least one mold attachment 793 onto the base liner mold 790 to create the customized liner mold 797.

Step 735: Produce a Customized Liner from the Customized Liner Mold

In this method, the customized liner mold 797 is used to "stamp" the convex/concave shape on lining material (e.g., thermoformable foam) to create the customized liner 799.

Step 740: Attach the Customized Liner to a Generic Piece of Wearable Equipment that is Represented in Virtual 3D Space by the Generic Equipment Model, Thereby to Produce a Customized Piece of Wearable Equipment With reference to FIG. 13, the customized liner 799 is attached to the selected generic goalie mask shell 790A. The customized piece of wearable equipment (i.e., goalie mask 798) is now ready to be delivered to/worn by the wearer.

Step 745: Optionally, Remove the at Least One Mold Attachment from the Customized Liner Mold, Thus Leaving Behind the Base Liner Mold.

To allow the base liner mold 792 to be reused to create other customized liners for other customized goalie masks, the at least one mold attachment 793 are removed from the customized liner mold 797, leaving behind the base liner mold 792. Removal can be achieved by ungluing or unplugging the at least one mold attachment 793, to name just two non-limiting possibilities.

Those skilled in the art will appreciate that VARIANT 2 has demonstrated the design of a desired liner model from which a customized mold is made, such customized mold including a base mold customized with one or more attachments. The customized mold is then used to produce (e.g., by thermoforming) a liner having substantially the 3D shape of the desired liner model. This can be viewed as a specific way of producing the liner from the desired liner model, in the context of a method of creating a goalie mask liner customized for a user. However, other ways may be envisaged, which do not necessarily go through the step of making a customized mold. Two such alternative ways are now described.

Figure 21:
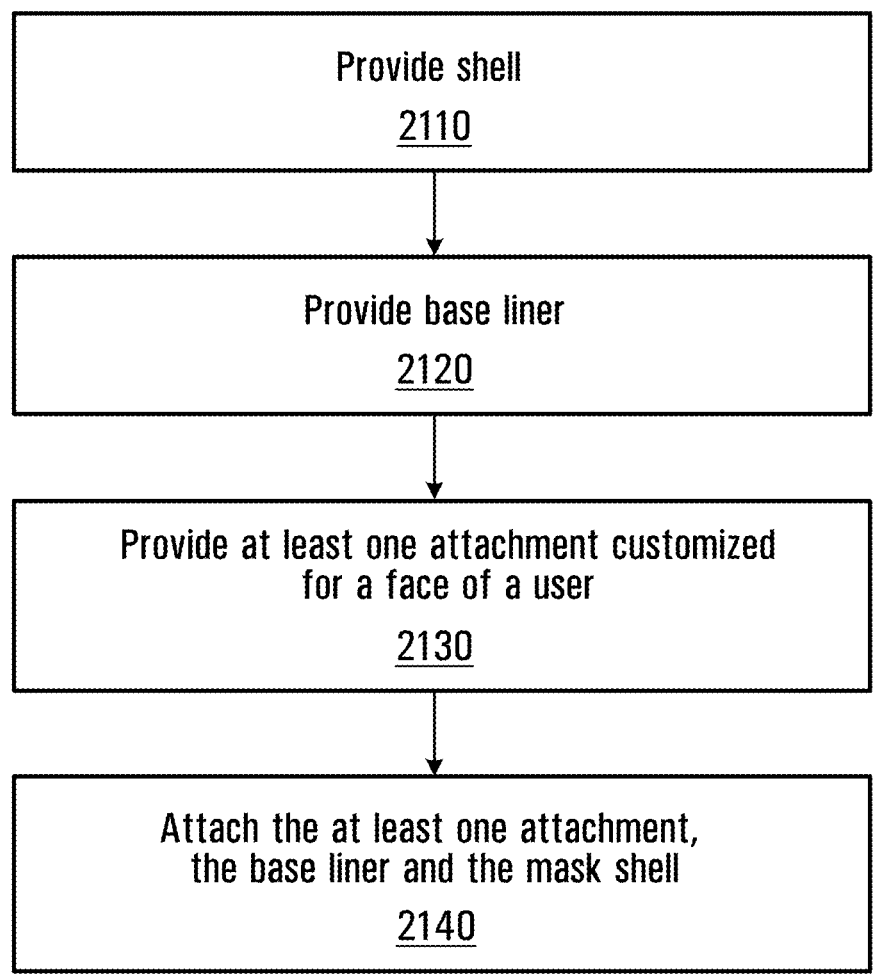
FIG. 21 is a flowchart showing steps of a manufacturing method for customized hockey goaltender mask, according to an example non-limiting embodiment.

With reference to FIG. 21, according to a first alternative method of manufacturing a customized hockey goaltender mask, a shell is provided (step 2110), as is a base liner (step 2120) and at least one liner attachment customized for a face of a user (step 2130). At step 2140, the at least one liner attachment, the base liner and the mask shell are attached together to create the customized hockey goaltender mask. The base liner may have a pre-determined minimum thickness throughout. As such, it may be possible to pre-certify the base liner for thickness, which would guarantee that the resulting liner (including the base liner and the at least one liner attachment) will retain the same thickness and thus continue to be certified for thickness.

As for the liner attachments, they may be designed based on a model of the face of the user, a model of the shell and a model of the base liner. Specifically, volumetric additions may be made to the model of the base liner in order to arrive at the desired liner model. The difference between the desired liner model and the base liner model (i.e., the extent of the volumetric additions) results in a model of the at least one liner attachment, which can then be produced (e.g., molded or 3D printed) or retrieved from inventory.

According to a second alternative method of manufacturing a customized hockey goaltender mask, the desired liner model (see step 715) may be produced by an additive manufacturing technique (e.g., 3D printing).

Those skilled in the art will appreciate that the above provides certain non-limiting examples. Depending on the embodiment, certain features may be omitted, and not all features are required for all embodiments to be operational. Further variants are possible and it will be appreciated that the scope of the invention is only to be limited by the claims appended hereto.

The invention claimed is:

1. A method of creating a mask liner customized for a user, comprising:
   obtaining a model of a shell;
   obtaining a model of a face of the user;
   positioning the model of the face relative to the model of the shell;
   creating a model of a liner that at least partly fills a space between the model of the shell and the model of the face of the user, wherein the model of the liner has a surface and a thickness at each point along the surface, and wherein for at least some points along the surface of the model of the liner, the thickness of the model of the liner is greater than a distance between the model of the shell and the model of the face at those points; and
   producing the mask liner from the model of the liner using production material.

2. The method defined in claim 1, wherein a ratio of said thickness to said distance is between 1.05 and 1.75.

3. The method defined in claim 1, wherein a ratio between the thickness of the liner and a distance between the model of the shell and the model of the face at a first subset of points is greater than a ratio between the thickness of the liner and a distance between the model of the shell and the model of the face at a second subset of points.

4. The method defined in claim 3, wherein the first subset of points is in an area of the model of the face that comprises cheeks of the face and wherein the second subset of points is in an area of the model of the face that comprises a forehead of the face.

5. The method defined in claim 1, wherein producing the mask liner using production material comprises using an additive manufacturing technique.

6. The method defined in claim 1, wherein producing the mask liner using production material comprises attaching at least one attachment to a base liner.

7. A goalie mask liner made in accordance with the method defined in claim 1.

8. A wearable mask, comprising:
   a shell; and
   a liner attached to the shell, the liner being customized for a face of a user in accordance with the method of claim 1.

9. A method of creating a mask liner customized for a user, comprising:
   obtaining a model of a shell;
   obtaining a model of a face of the user, the model of the face including designated locations for eyes of the user;
   obtaining a model of a cage having bars forming apertures, the model of the cage being configured to interconnect with the model of the shell;
   positioning the model of the face relative to the model of the shell;
   creating a model of a liner that at least partly fills a space between the model of the shell and the model of the face of the user, wherein the model of the liner is created so as to position the model of the cage such that the eyes have a view that is in line with two of the apertures or that is unobstructed by the bars of the cage in a cone of a predefined size; and
   producing the mask liner from the model of the liner using production material.

10. The method defined in claim 9, wherein producing the mask liner comprises using an additive manufacturing technique.

11. The method defined in claim 9, wherein producing the mask liner comprises attaching at least one attachment to a base liner.

12. The method defined in claim 9, further comprising creating from the model of the liner a custom mold, wherein producing the mask liner comprises molding the mask liner using the custom mold and the production material.

13. A goalie mask liner made in accordance with the method defined in claim 7.

14. A wearable mask, comprising:
   a shell; and
   a liner attached to the shell, the liner being customized for a face of a user in accordance with the method of claim 9.

15. A method of creating a mask liner model customized for a user, comprising:
   obtaining a model of a shell;
   obtaining a model of a face of the user;
   positioning the model of the face relative to the model of the shell;
   creating a model of a liner that at least partly fills a space between the model of the shell and the model of the face of the user, wherein the model of the liner has a surface and a thickness at each point along the surface, and wherein for at least some points along the surface of the model of the liner, the thickness of the model of the liner is greater than a distance between the model of the shell and the model of the face at those points; and
   storing the model of the liner in a non-transitory memory or outputting the model of the liner via a display screen.

16. A method of creating a mask liner model customized for a user, comprising:
   obtaining a model of a shell;
   obtaining a model of a face of the user, the model of the face including designated locations for eyes of the user;
   obtaining a model of a cage having bars forming apertures, the model of the cage being configured to interconnect with the model of the shell;
   positioning the model of the face relative to the model of the shell;
   creating a model of a liner that at least partly fills a space between the model of the shell and the model of the face of the user, wherein the model of the liner is created so as to position the model of the cage such that the eyes have a view that is in line with two of the apertures or that is unobstructed by the bars of the cage in a cone of a predefined size; and
   storing the model of the liner in a non-transitory memory or outputting the model of the liner via a display screen.

* * * * *